United States Patent [19]
Shimbara et al.

[11] Patent Number: 5,477,268
[45] Date of Patent: Dec. 19, 1995

[54] METHOD OF AND APPARATUS FOR FINISHING A SURFACE OF WORKPIECE

[75] Inventors: Yoshimi Shimbara; Hiroshi Kiba; Kazumoto Tanaka, all of Hiroshima; Kazuo Hironaka, Hatsukaichi, all of Japan

[73] Assignee: Mazda Motor Corporation, Hiroshima, Japan

[21] Appl. No.: 261,023

[22] Filed: Jun. 14, 1994

Related U.S. Application Data

[63] Continuation of Ser. No. 926,455, Aug. 10, 1992, abandoned.

[30] Foreign Application Priority Data

Aug. 8, 1991 [JP] Japan .................................. 3-225038
Aug. 31, 1991 [JP] Japan .................................. 3-246971
Aug. 31, 1991 [JP] Japan .................................. 3-246972

[51] Int. Cl.$^6$ .................................................. H04N 17/00
[52] U.S. Cl. ........................... 348/128; 348/125; 348/92
[58] Field of Search ............................. 348/86, 92, 125, 348/128, 131, 132; 395/82, 97, 95; 901/44

[56] References Cited

U.S. PATENT DOCUMENTS

| | | | |
|---|---|---|---|
| 4,498,414 | 2/1985 | Kiba et al. | 901/43 |
| 4,541,011 | 9/1985 | Mayer et al. | 358/106 |
| 4,878,114 | 10/1989 | Huynh et al. | 73/105 |
| 4,909,869 | 3/1990 | Sakamoto et al. | 348/86 |
| 4,941,182 | 7/1990 | Patel | 358/101 |
| 4,942,538 | 7/1990 | Yuan et al. | 348/95 |
| 5,010,578 | 4/1991 | Siener et al. | 73/104 |
| 5,067,085 | 11/1991 | Wenzel et al. | 901/44 |
| 5,096,353 | 3/1992 | Tesh et al. | 901/47 |
| 5,101,442 | 3/1992 | Amir | 382/8 |
| 5,237,404 | 8/1993 | Tanaka et al. | 348/132 |

Primary Examiner—Tommy P. Chin
Assistant Examiner—Vu Le
Attorney, Agent, or Firm—Keck, Mahin & Cate

[57] ABSTRACT

An apparatus is utilized to detect defects and finish a surface of a workpiece moving at a predetermined speed along an automatic finishing line. The defects are detected and the surface is finished by a manipulator disposed at a predetermined finishing station of the automatic finishing line. The manipulator has an image pickup device and a finishing device combined into one unit. The apparatus performs the steps of moving the manipulator relative to a workpiece while detecting a surface defect on a surface of the workpiece with the image pickup device. The apparatus moves the manipulator at the same speed as the workpiece while finishing the surface defects on the surface of the workpiece with the finishing device.

13 Claims, 19 Drawing Sheets

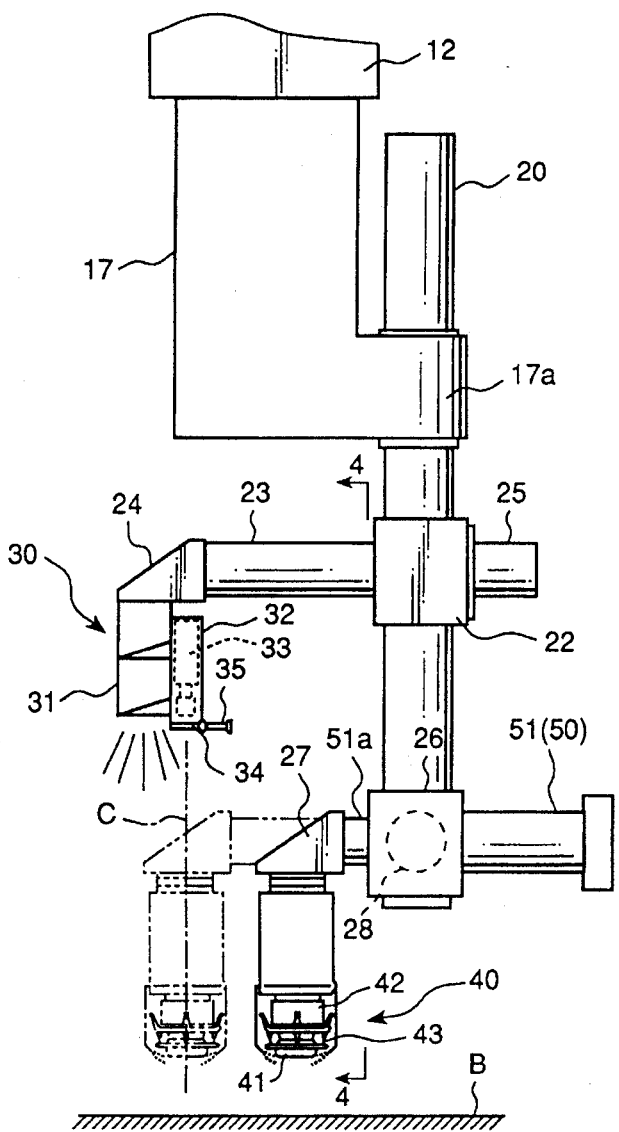
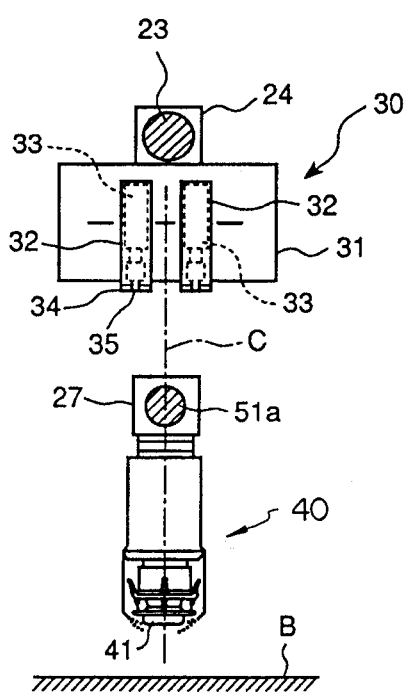
Fig. 3
Fig. 4

METHOD OF AND APPARATUS FOR FINISHING A SURFACE OF WORKPIECE

This is a continuation of application Ser. No. 07/926,455, filed Aug. 10, 1992, abandoned.

BACKGROUND OF THE INVENTION

1. Field of the Invention

The present invention relates to a method of and an apparatus for automatically finishing a workpiece and, more particularly, to a method of and an apparatus for automatically detecting surface defects and finishing a surface by eliminating surface defects on a workpiece. Such a surface may be the painted surface of a vehicle body.

2. Description of Related Art

Automobile manufacturing lines typically include a surface polishing line for automatically polishing a painted or coated vehicle body surface. A surface polishing line of this kind includes a surface defect detecting station for detecting defects on a painted surface of a vehicle body and a water polishing station for polishing the surface defects to remove them from the surface of the vehicle body. An operator typically visually detects defects on a painted surface of a vehicle body and manually inputs data representative of location, grade, etc., of each surface defect into a terminal device of a polishing line control system at the surface defect detecting station. Based on the data concerning the surface defects, a polishing robot or manipulator automatically polishes out the surface defects. Such a method of and an apparatus for polishing out surface defects on a painted surface of a vehicle body is known from, for instance, Japanese Unexamined Patent Publication No. 58-64,517.

Because painted surface defects must be visually detected by an operator and data representative of the painted surface defects must be input into a terminal device of a polishing line control system, the painted surface defect polishing method and apparatus described in the above-mentioned publication is high in labor requirements.

To save labor in polishing and finishing a painted surface of a vehicle body, in Japanese patent application No. 3-93,040, it has been proposed to provide a surface polishing line for automatically polishing and finishing a painted surface of a vehicle body. In such a surface polishing line, a painted surface of a vehicle body is automatically monitored by an electronic image pick-up device provided at the surface defect detecting station. The electronic image pick-up device automatically detects painted surface defects. The image pick-up device scans surface areas into which the whole surface area of the vehicle body is spatially divided so as to provide image signals of each surface area. Based on data representative of a surface defect in the surface area, such as position data, which is obtained by analyzing the image signals through the use of an image processing device, the polishing manipulator automatically polishes out the surface defects.

In order for the polishing manipulator or robot to locate a polishing tool in the exact position of a surface defect, a calculation must be done to find both a direction in and a distance over which the polishing tool should be moved. This calculation is performed based on the coordinates of the surface defect in a specific surface area and a relative position of the polishing tool with respect to a center of the specific surface area scanned by the image pick-up device. Because a calculation of appropriate directions and distances for the polishing tool requires a long time, polishing out of surface defects is slowed down and polishing tool positioning accuracy is decreased.

For speedy positioning of the polishing tool at the locations of surface defects, it is desirable to install the polishing tool as close to the image pick-up device as possible. However, it is difficult to locate the image pick-up device, which is a very precise optical instrument, close to the polishing tool without polluting the image pick-up device with particles produced during polishing.

SUMMARY OF THE INVENTION

It is an object of the present invention to provide a method of and apparatus for automatically detecting and polishing out surface defects in a workpiece. According to the present invention, a polishing tool is moved quickly and accurately to a position at which a surface defect exists in the surface of the workpiece.

It is another object of the present invention to provide a method of and apparatus for automatically detecting and polishing a surface defect in a workpiece which provides a simplified automatic finishing line and allows building of the automatic finishing line at a low cost.

These objects are accomplished by providing a method of and apparatus for detecting and finishing surface defects in a surface of a workpiece which is moved, at a predetermined speed, along an automatic finishing line by a manipulator or robot. The apparatus is disposed at a predetermined finishing station of an automatic finishing line, and has an image pickup means and a finishing device combined into one unit.

The manipulator is moved relative to a workpiece while a surface defect in a surface of the workpiece is detected and data representative of the surface defect is provided by the image pickup means. The manipulator is moved at the same speed as the workpiece while the finishing means polishes our or finishes the surface defect in the surface of the workpiece.

Specifically, the finishing means is shifted to a position at which the surface defect exists from a position uncovered by a visual field of the image pickup means and via an original position in which a vertical axis of the finishing means is in alignment with the axis of the visual field, based on the defect data.

In order to perform the method, an apparatus for detecting and finishing a surface defect includes drive means, such as a manipulator or robot, movable in three dimensions, for supporting the image pickup means and the finishing means so that a vertical axis of the finishing means and an axis of the view field of the image pickup means align with each other in a vertical straight line. The apparatus moves the image pickup means so as to detect surface defects and provide defect data. The apparatus also moves the finishing means based on the defect data so as to polish out or finish the surface defects. The drive means includes shift means for shifting the finishing means between the original position and a rest position, at which the finishing means is out of the view field. The shift means is caused, by control means, to shift the finishing means to the rest position from the original position before the image pickup means picks up an image of the surface of the workpiece. The shift means is further caused to return the finishing means to the original position after the image pickup means has picked up the image.

BRIEF DESCRIPTION OF THE DRAWINGS

The above and other objects and features of the present invention will be apparent to those skilled in the art from the following description of preferred embodiments when considered in conjunction with the drawings, in which the same reference numerals have been used to denote the same or similar elements throughout and in which:

FIG. 3 is a side view of an upper surface defect detecting and polishing unit of the upper surface defect detecting and polishing manipulator;

FIG. 4 is a front view along line 4—4 of FIG. 3;

DETAILED DESCRIPTION OF THE PREFERRED EMBODIMENTS

Figure 1:
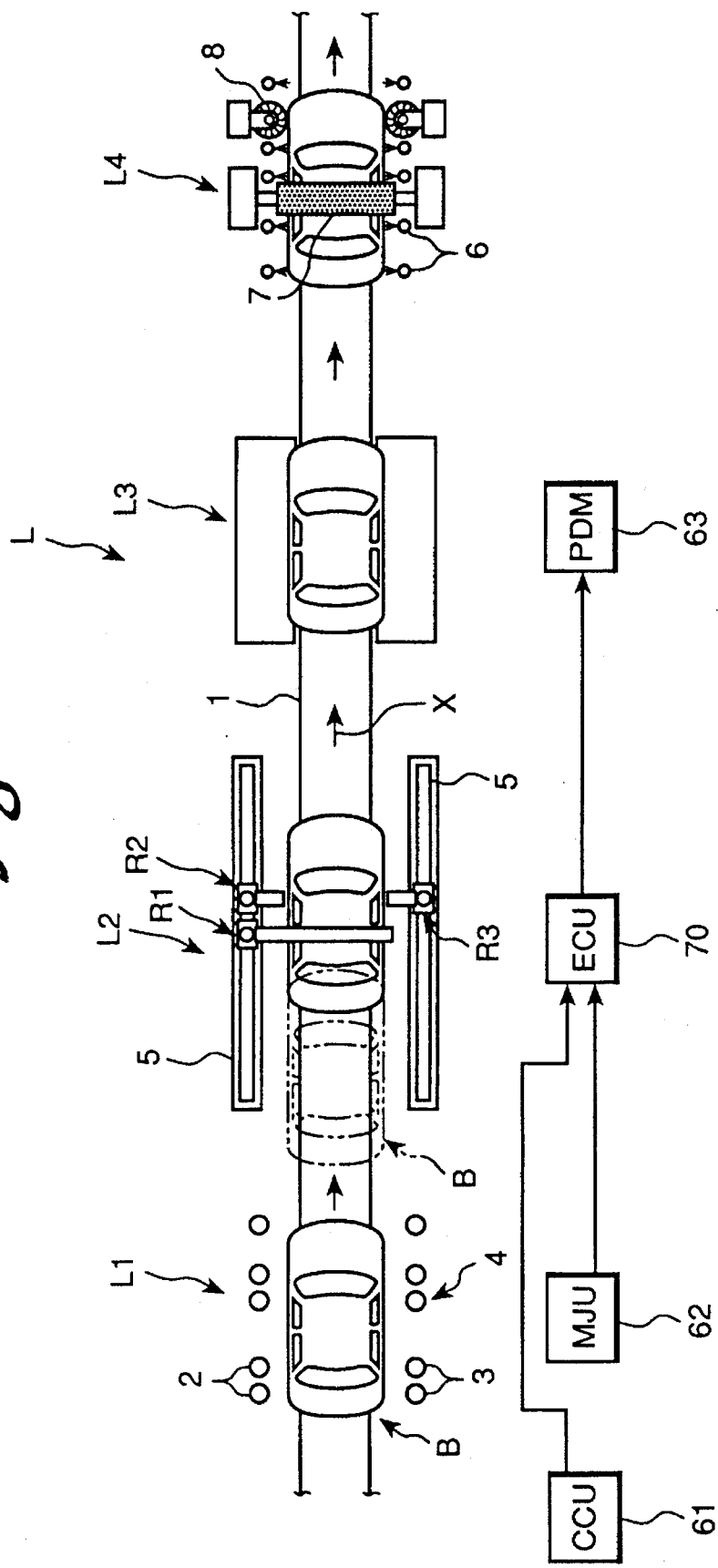
FIG. 1 is a schematic illustration showing a surface polishing line of an automobile manufacturing line including a surface polishing and finishing apparatus in accordance with a preferred embodiment of the present invention.

Referring to the drawings in detail and, in particular, to FIG. 1, a vehicle body finishing line L of an automobile manufacturing line is shown as being located after a painting or coating line. The vehicle body finishing line L includes several stations, such as a vehicle model judging station L1 for automatically determining a vehicle body model, an automatic polishing station L2 for automatically detecting and polishing out a painting defect or painting defects on a vehicle body, a manual polishing station L3 for polishing out painting defects, and a water washing station L4 for washing a vehicle body. These stations L1 to L4 are arranged along a chain conveyor 1 running in a straight line shown by an arrow X. A vehicle body B, which has been painted in the painting line, is placed on the chain conveyor 1 before the vehicle model judging station L1 and is transferred through the stations L1 to L4 at a constant speed by the chain conveyor 1 passing through the stations L1 to L4.

At the vehicle model judging station L1, a vehicle model sensor 4 is provided for detecting a specific characteristic or configuration of the vehicle body so as to determine the model of the vehicle body. The vehicle model sensor 4 includes a plurality of light emitting elements 2, such as light emitting diodes, arranged along one side of the chain conveyor 1, and a plurality of light receiving elements 3 arranged along the other side of the chain conveyor 1. The same number of light receiving elements 3 and light emitting elements 2 are provided so that each light receiving element 3 corresponds in position to that of a light emitting element 2. Based on a pattern of outputs of the light receiving elements 3, a model judging unit (MJU) 62 determines the model of the vehicle body B.

At the automatic polishing station L2, there are provided a first or top surface polishing robot or manipulator R1 and second and third or left and right side surface polishing robots or manipulators R2 and R3. The first and second manipulators R1 and R2 are slidably mounted on a guide rail 5 extending in a lengthwise direction of the chain conveyor 1 on one side of the chain conveyor 1. Similarly, the third manipulator R3 is slidably mounted on a guide rail 5 extending in the lengthwise direction of the chain conveyor 1 on the other side of the chain conveyor 1. All of the first to third surface polishing manipulators R1, R2 and R3 are of an orthogonal coordinate type. The first manipulator R1 is provided with a plurality of image pick-up devices 30 for scanning specific subdivisions of an upper surface of the vehicle body B, including a front hood, a top roof and a trunk lid, which will be described later, so as to pick up images of the subdivisions. The first manipulator is also provided with a plurality of surface polishing tools 40 for polishing defects in the specific subdivisions. Similarly, each of the second and third manipulators R2 and R3 is provided with a plurality of image pickup devices 30A for scanning specific subdivisions of a side surface of the vehicle body B, including a front fender, a door and a rear fender, so as to pick up images representative of the subdivisions, and a plurality of surface polishing tools 40A for polishing defects D in the specific subdivisions. The image pick-up device 30 or 30A and the polishing tool 40 or 40A are paired to three polishing units.

At the water washing station L4, a plurality of water showers 6 is disposed on opposite sides of the chain conveyor 1. A top surface washing brush 7 and side surface washing brushes 8 are provided.

Figure 2:
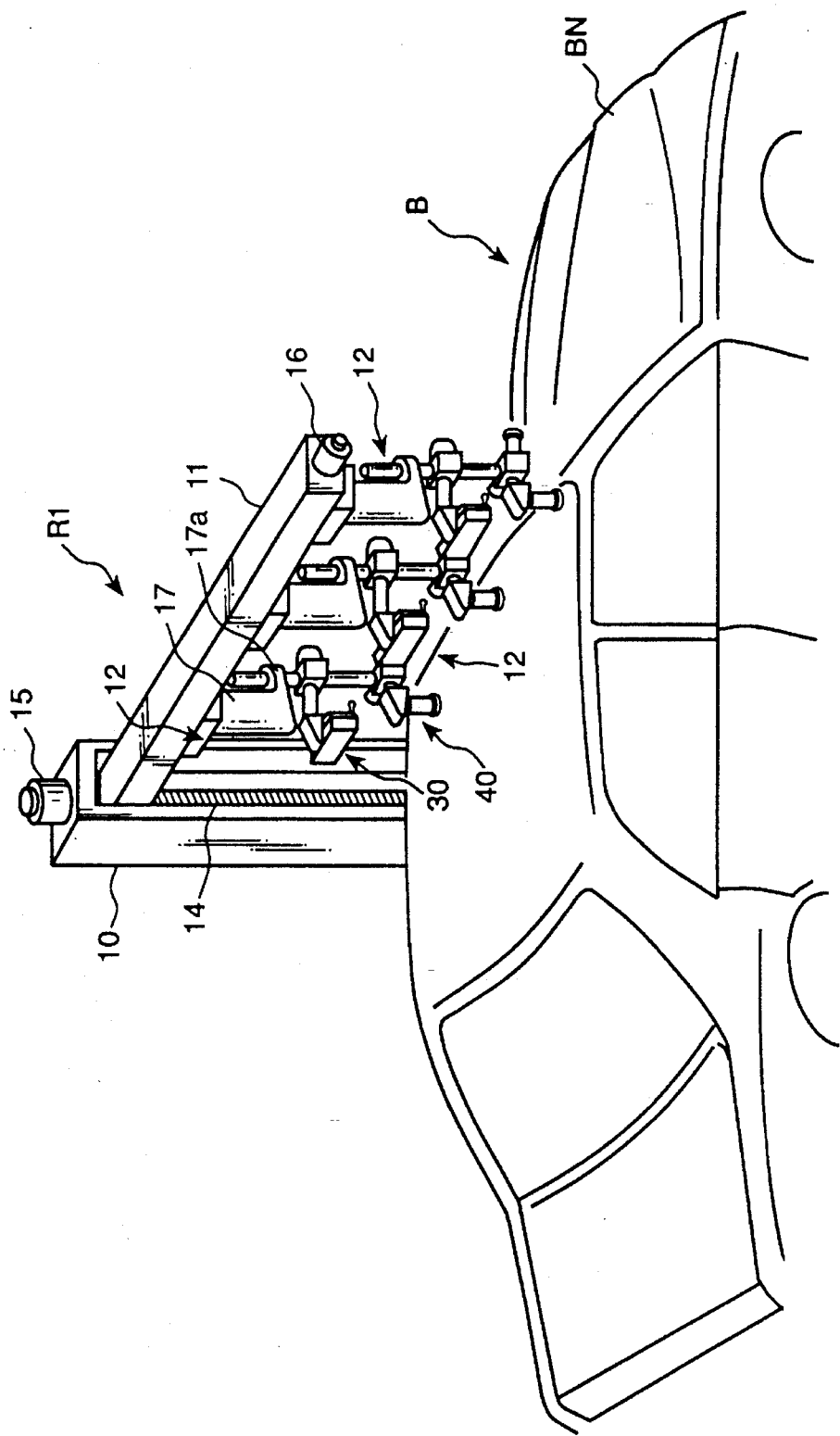
FIG. 2 is a perspective view of an upper surface defect detecting and polishing manipulator of the surface polishing and finishing apparatus.

FIG. 2 shows the mechanical details of the top surface polishing manipulator R1. A channel shaped stand 10 is mounted on the guide rail 5 through a servo motor operated rack and pinion mechanism (not shown) for back and forth movement in the lengthwise direction of the chain conveyor 1. The lengthwise direction is hereafter referred to as an X direction. The stand 10 is provided with a threaded rod or lead screw 14 rotatably supported thereby. The lead screw 14 is turned by a reversible servo motor 15 attached to a top end of the stand 10. A cross beam 11 is mounted on the lead screw 14 through a ball nut (not shown) so as to move up and down or in a vertical direction. The vertical direction is hereafter referred to as a Z direction. The cross beam 11 is moved in the Z direction when the lead screw 14 is turned in opposite directions by the servo motor 15. The cross beam 11 is provided with a threaded rod or lead screw (not shown) rotatably supported thereby. The lead screw (not shown) supported by the cross beam 11 is turned by means of a reversible servo motor 16 attached to an end of the cross beam 11.

The cross beam 11 is provided with a plurality of, for instance three, in this embodiment, polishing units 12 arranged at equal separations. Each of the polishing units has an image pickup device 30 and a polishing tool 40. The polishing units 12 are movably mounted on the lead screw supported by the cross beam 11 through ball nuts (not shown) so as to move back and forth in a transverse direction of the chain conveyor 1. The transverse direction is hereafter referred to as a Y direction. The polishing units 12 move all at once when the lead screw is turned in opposite directions by the servo motor 16.

FIGS. 3 and 4 show the details of the polishing unit 12. Each of the polishing units 12 includes a cross head 17 formed with a fastening block 17a to which a supporting stem 20, extending in the Z direction, is fastened. The supporting stem 20 is provided with an upper mount block 22 at its middle portion. A tailstock 23 is supported by the upper mount block 22 for rotation about a center axis thereof extending in the X direction. The tailstock 23 mounts the image pickup device 30 by a fitting bracket 24 at one end thereof. The image pickup device 30 includes an illumination light source contained in a casing 31 secured to the bracket 24, and a pair of cameras, such as charge coupled device (CCD) cameras 33 contained in camera casings 32 secured to the casing 31. A servo motor 25 is fastened to one side of the upper mount block 22, opposite to a side from which the tailstock 23 extends, so as to turn the tailstock 23. When the servo motor 25 is actuated, it turns the image pickup device 30 about the center axis of the tailstock 23. Turning the image pickup device 30 allows the CCD cameras 33 to place their image surfaces approximately parallel to a subdivision of a curved top surface of a vehicle body. Each camera casing 32 is provided with a shutter blade 34, which is operated by means of an air cylinder 35 so as to move between an open position, in which the CCD camera 33 is exposed, and a closed position, in which the CCD camera 33 is concealed.

The supporting stem 20 is further provided with a lower mount block 26 at its lower end portion. The lower mount block 26 supports a hydraulic tailstock 51, such as a hydraulic cylinder having a spindle 51a extending in the X direction, which forms a part of a shift and turn mechanism 50. The tailstock 23 mounts the polishing tool 40 by means of a fitting bracket 27 at one end of the spindle 51a. The polishing tool 40 includes a polishing pad 41, a motor 42 for turning the polishing pad at a high speed, and a pressure sensor 43 for detecting polishing pressure. Thrusting the spindle 51a back and forth changes the position of the polishing tool 40 between a retracted position, in which the polishing tool 40 is removed from the image pickup device 30, as shown by solid lines in FIG. 3, and a protruded position (which is referred to as an original position), in which the polishing tool 40 is placed below the image pickup device 30, as shown by a double dotted line in FIG. 3. The lower mount block 26 further supports a servo motor 28 for turning the spindle 51a of the hydraulic tailstock 51 about a center axis of the spindle 51a so as to turn the polishing tool 40 about the center axis of the spindle 51a. Turning the polishing tool 40 allows the polishing pad 41 to place its surface approximately parallel to a subdivision of a curved surface of a vehicle body.

Figure 5:
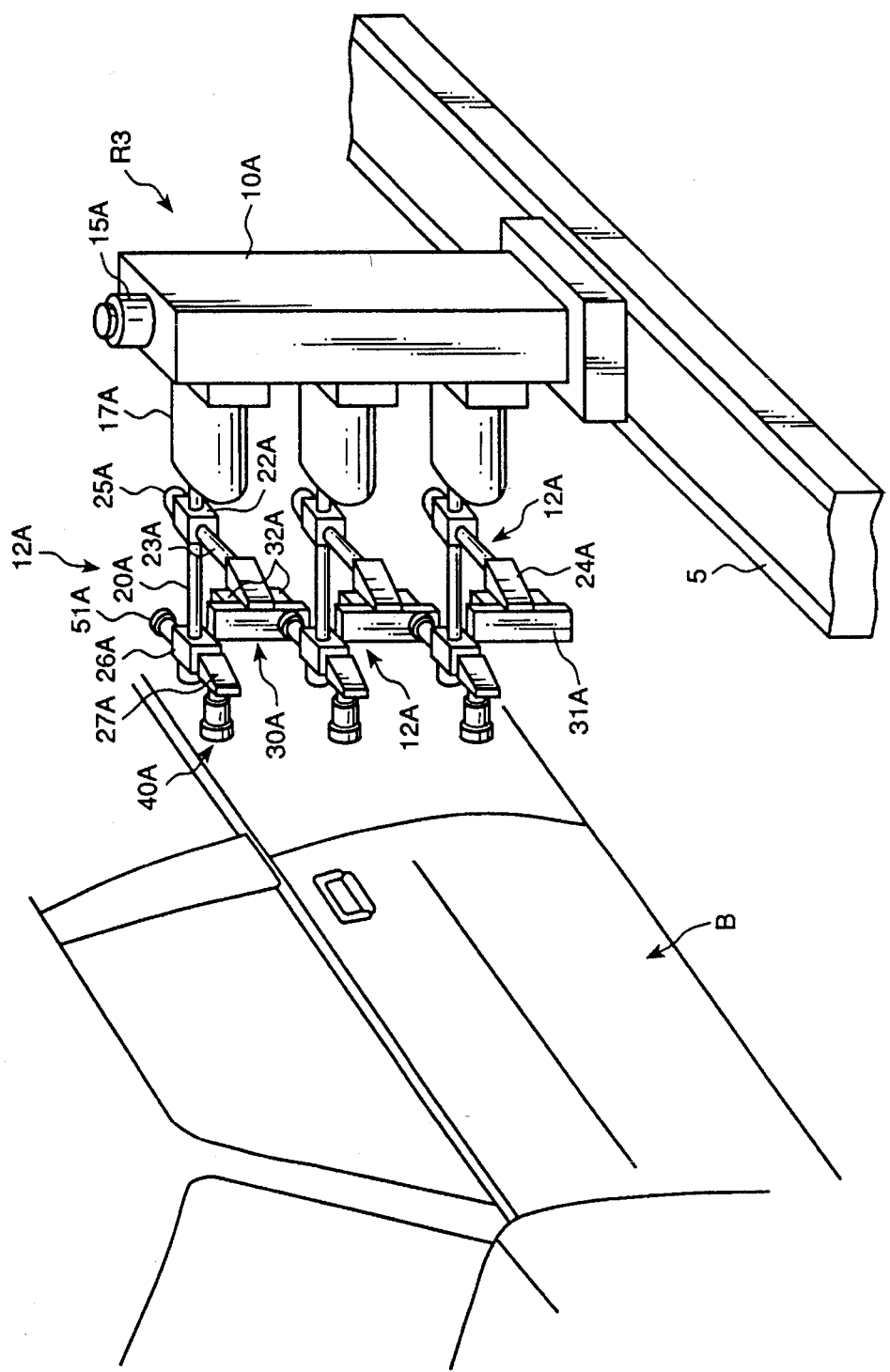
FIG. 5 is a perspective view of a side surface defect detecting and polishing manipulator of the surface polishing and finishing apparatus.

FIG. 5 shows the mechanical details of the side surface polishing manipulator R3, which has the same structure and operation as the side surface polishing manipulator R2. A channel shaped stand 10A is mounted on the guide rail 5 through a servo motor operated rack and pinion mechanism (not shown) for back and forth movement in the X direction. The stand 10A is provided with a threaded rod or lead screw (not shown) rotatably supported thereby. The lead screw is turned by a reversible servo motor 15A attached to a top end of the stand 10A.

The stand 10A is provided with a plurality of polishing units 12A arranged at equal separations. Each of the units 12A has an image pickup device 30A and a polishing tool 40A. In this embodiment, three polishing units are provided. The polishing units 12A are movably mounted on the lead screw supported by the stand 10A through ball nuts (not shown) so as to move up and down in the vertical or Z direction all at once when the lead screw is turned in opposite directions by the servo motor 15A.

Each of the polishing units 12A includes a cross head 17A to which a supporting stem 20A, extending in the Y direction, is fastened. The supporting stem 20A is provided with an outer mount block 22A at its middle portion. A tailstock 23A is supported by the outer mount block 22A for rotation about a center axis thereof extending in the X direction. The tailstock 23A mounts the image pickup device 30A by a fitting bracket 24A at one end thereof. The image pickup device 30 includes an illumination light source contained in a casing 31A secured to the bracket 24A. A pair of cameras, such as charge coupled device (CCD) cameras (not shown), is contained in camera casings 32A secured to the casing 31A. A servo motor 25A is fastened to one side, opposite to a side from which the tailstock 23A extends, of the upper mount block 22A so as to turn the tailstock 23A. When the servo motor 25A is actuated, it turns the image pickup device 30A about the center axis of the tailstock 23A. Turning the image pickup device 30A allows the CCD cameras to place their image surfaces approximately parallel to a subdivision of a curved side surface of a vehicle body. Each camera casing 32A is provided with a shutter blade and an air cylinder which are the same in structure and operation as those of the image pickup device 30 of the polishing units 12 for top surface polishing shown in FIGS. 3 and 4.

The supporting stem 20A is further provided with an inner mount block 26A at its inner end portion. The inner mount block 26A supports a hydraulic tailstock 51A, which may be a hydraulic cylinder having a spindle (not shown) extending in the X direction. The tailstock 23A mounts the polishing tool 40A by means of a fitting bracket 27A at one end of the spindle. The polishing tool 40A includes a polishing pad, a motor and a pressure sensor, all of which are the same in structure and operation as those of the polishing tool 40 of the polishing units 12 for top surface polishing shown in FIGS. 3 and 4. Thrusting the spindle back and forth changes the position of the polishing tool 40A between a retracted position, in which the polishing tool 40A is removed from the image pickup device 30A, and a protruded position (which is referred to as a standard position), in which the polishing tool 40A is placed beside the image pickup device 30A. The inner mount block 26A further supports a servo motor (not shown) for turning the spindle of the hydraulic tailstock 51A about a center axis of the spindle so as to turn the polishing tool 40A about the center axis of the spindle. Turning the polishing tool 40A allows the polishing pad to place its surface approximately parallel to a subdivision of a curved side surface of a vehicle body.

Figure 6:
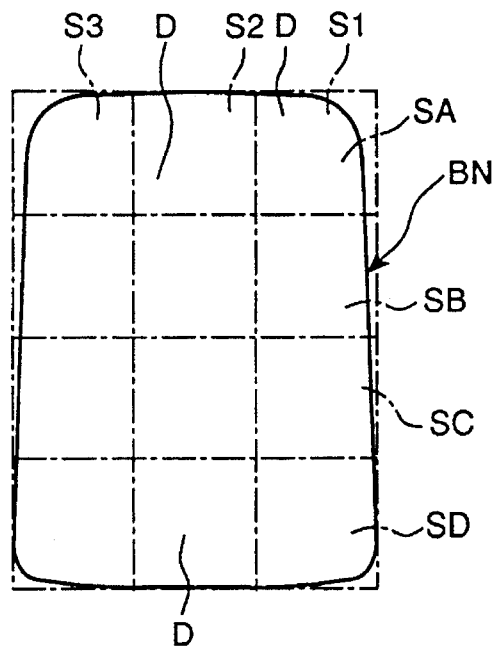
FIG. 6 is a plan view of a hood of a vehicle body showing image areas scanned by an image pickup means.

The surface polishing manipulators R1, R2 and R3 automatically scan specific subdivisions of a surface of a vehicle body and polish painting defects in the specific subdivisions, respectively. In more detail, taking the upper surface polishing manipulator R1 for polishing a hood BN of a vehicle body B as an example, the whole subdivision of an surface of the hood BN is spatially divided into a matrix, such as one having three rows S1, S2 and S3 in the transverse or Y direction and four columns SA, SB, SC and SD, as shown in FIG. 6. Each column of subdivisions SA1 to SD1, SA2 to SD2 or SA3 to SD3 is scanned and polished by a specific polishing unit 12. The image pickup devices 30 of the upper surface polishing manipulator R1 picks up images representative of the subdivisions of the same column simultaneously and images representative of the consecutive rows of subdivisions, one after another, at predetermined and equal intervals. Each pair of the CCD cameras 33 of the image pickup device 30 of each polishing unit 12 is designed and adapted so as to cover an area which is more than half of the area of the individual subdivision S and which overlaps partly with another such area along a center line extending in the X direction.

The subdivision S is defined by either a rectangle or a square, with a center at the origin O of an orthogonal coordinate system. The X direction is used as the X-coordinate axis, and the Y direction is used as the Y-coordinate axis. When the image pickup device 30 picks up an image representative of the subdivision S, the upper surface polishing manipulator R1 places the CCD cameras 33 so that a vertical center line C (see FIGS. 3 and 4) between optical axes of the CCD cameras 33 is aligned with a vertical line passing the origin O of the orthogonal coordinate system. The CCD cameras 33 are positioned at a predetermined vertical distance from the surface of the hood BN. When the polishing tool 40 is in its retracted position, the upper surface polishing manipulator R1 places the polishing tool 40 out of the subdivision S. On the other hand, when the polishing tool 40 is in its protruded position, the upper surface polishing manipulator R1 places the polishing tool 40 so that a vertical center line of the polishing tool 40 is in alignment with the vertical center line C between optical axes of the CCD cameras 33, and hence with the vertical line passing the origin O of the orthogonal coordinate system. All other portions of the surface of the vehicle body, other than the hood BN, are divided into subdivisions in the same manner.

Figure 8:
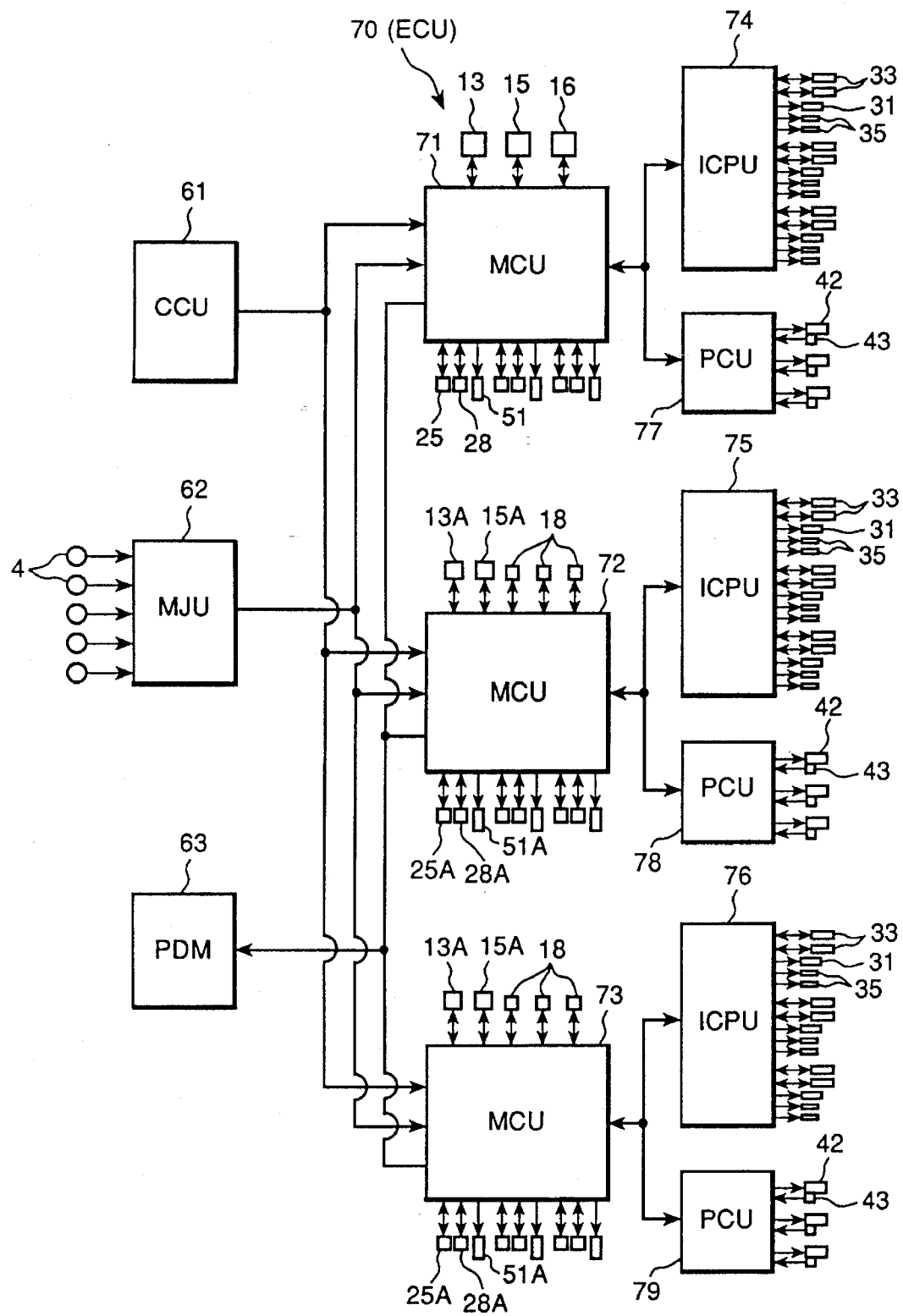
FIG. 8 is a block diagram showing a control system for the surface polishing and finishing apparatus.

FIG. 8 shows a controller 70 for controlling the vehicle body finishing line L. The controller 70 cooperates with a conveyor control unit (CCU) 61 for controlling running of the chain conveyor 1, a vehicle model judging unit (MJU) 62 for monitoring and judging vehicle model based on output signals from the vehicle model sensor 4, and a painting defect monitor (PDM) 63 disposed at the manual polishing station L3 for indicating painting defects to an operator. The electric control unit (ECU) 70 includes manipulator control units (MCU) 71, 72 and 73 for controlling the surface polishing manipulators R1, R2 and R3, image pickup control and processing units (ICPU) 74, 75 and 76 for controlling the image pickup devices 30 and 30A and processing images picked up by the image pickup devices 30 and 30A, and polishing control units (PCU) 77, 78 and 79 for controlling the surface polishing tools 40 and 40A. The manipulator control units 71, 72 and 73 are interfaced by bus lines so that data can be exchanged among them. Each manipulator control unit 71, 72 or 73 is interfaced with its associated image pickup control and processing unit 74, 75 or 76 and its associated polishing control unit 77, 78 or 79, respectively, by a bus line so as to exchange data therebetween.

The conveyor control unit 61 sends a conveying pulse signal, with which the chain conveyor 1 is moved at a constant speed corresponding to the pulse frequency, to all of the manipulator control units 71, 72 and 73. The vehicle model judging unit 62 sends a vehicle model signal to all of the manipulator control units 71, 72 and 73. The conveying pulse signal and the vehicle model signal are also transferred to all of the image pickup control and processing units 74, 75 and 76 and the polishing control units 77, 78 and 79 through the manipulator control units 71, 72 and 73, respectively. The painting defect monitor 63 receives data concerning painting defects and defect polishing from the manipulator control units 71, 72 and 73 to display data representative of surface conditions or, otherwise, an image representative of the surface of the vehicle body.

Each of the control units 71–79 is formed mainly by a microcomputer, such as one including a central processing unit (CPU), a read only memory (ROM), a random access memory (RAM), an input-output interface and a driver. The ROM of each manipulator control unit 71, 72 or 73 carries data for a programmed control sequence controlling shift speeds and shift positions of the surface polishing manipulator R, positions of the image pickup devices 30, 30A, and positions of the polishing tools 40, 40A for various vehicle models. The ROM of each image pickup control and processing unit 74, 75 or 76 carries data for a programmed image processing sequence performing image processing for discriminating painting defects and determining positions of the painting defects based on image signals provided from the CCD cameras 33 or 33A. The ROM of each polishing control unit 77, 78 or 79 carries data for a programmed polishing sequence establishing polishing conditions based on control data provided from the manipulator control unit 71, 72 or 73 and the image pickup control and processing unit 74, 75 or 76.

Figure 9A:
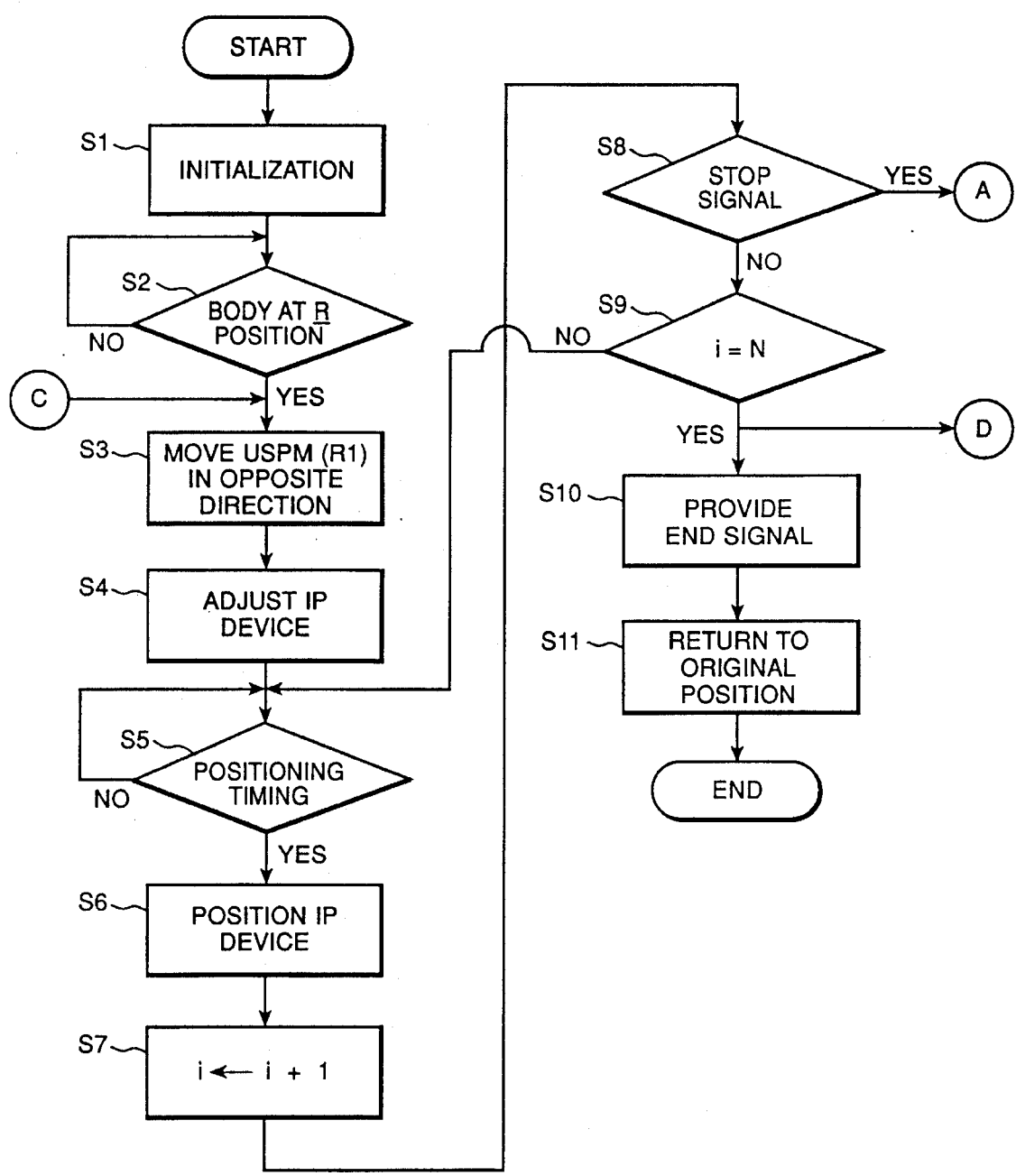
FIGS. 9A and 9B are flow charts illustrating a manipulator control sequence routine.
Figure 9B:
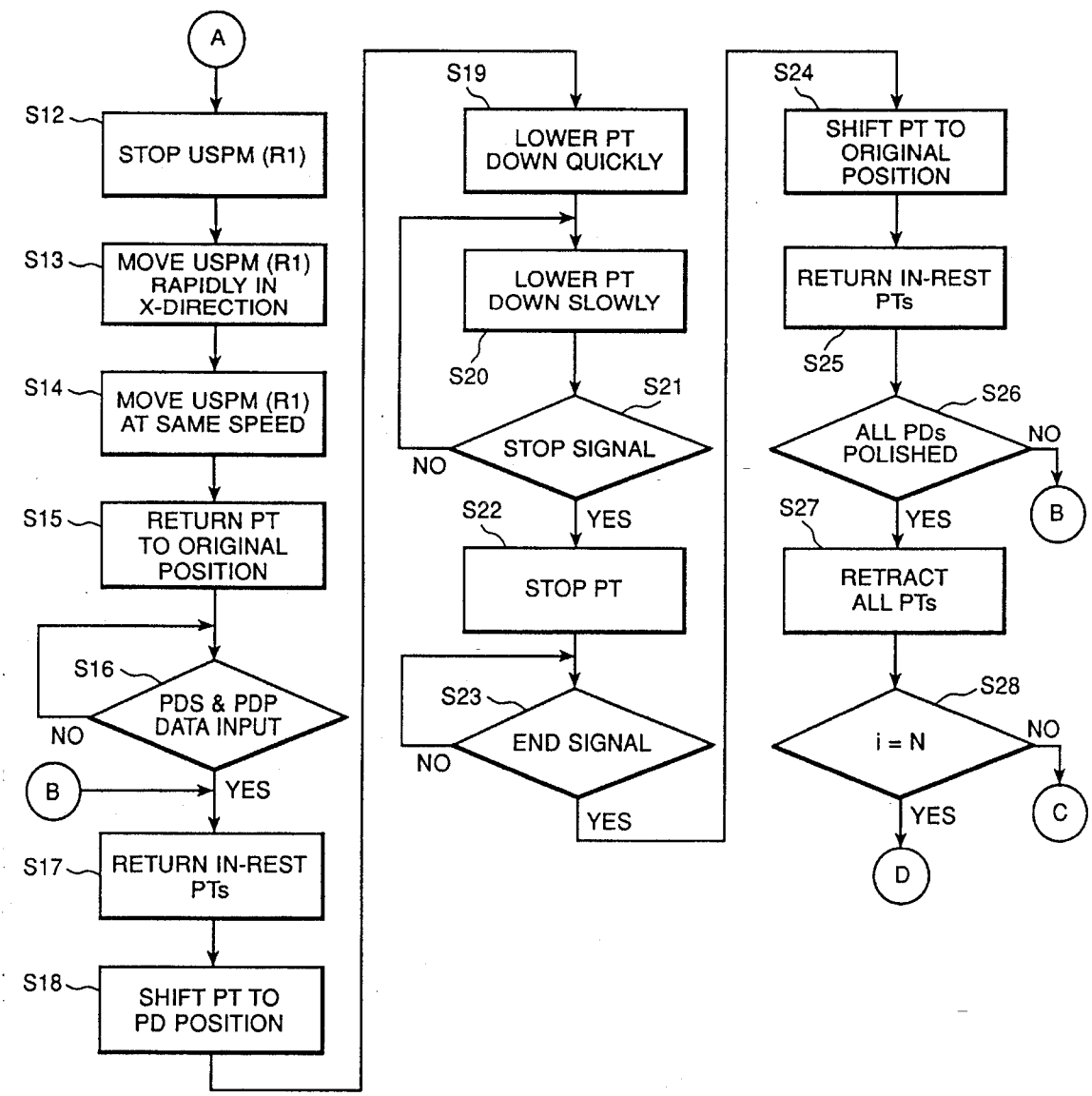
Figure 10:
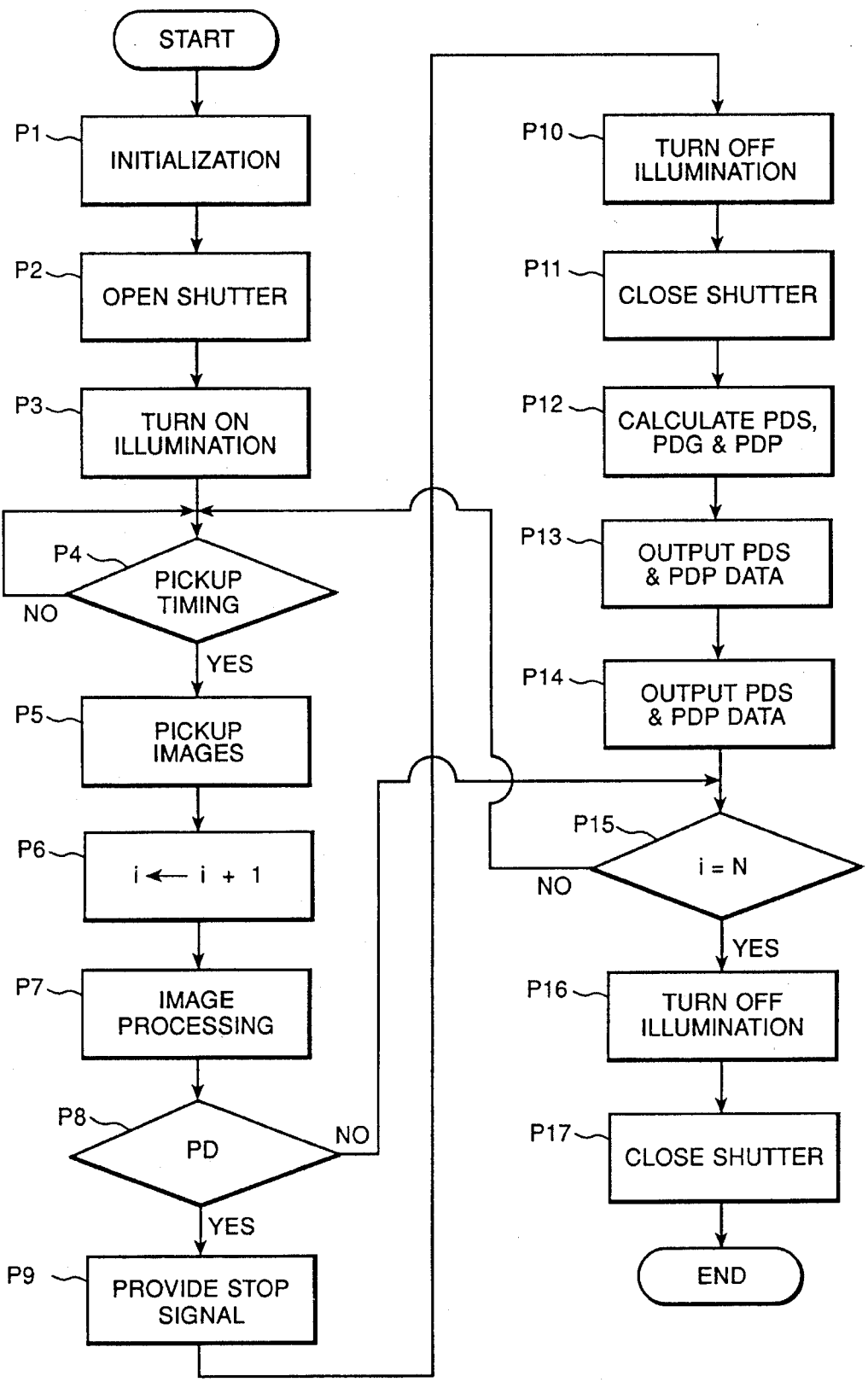
FIG. 10 is a flow chart illustrating an image pickup and processing sequence routine.
Figure 11:
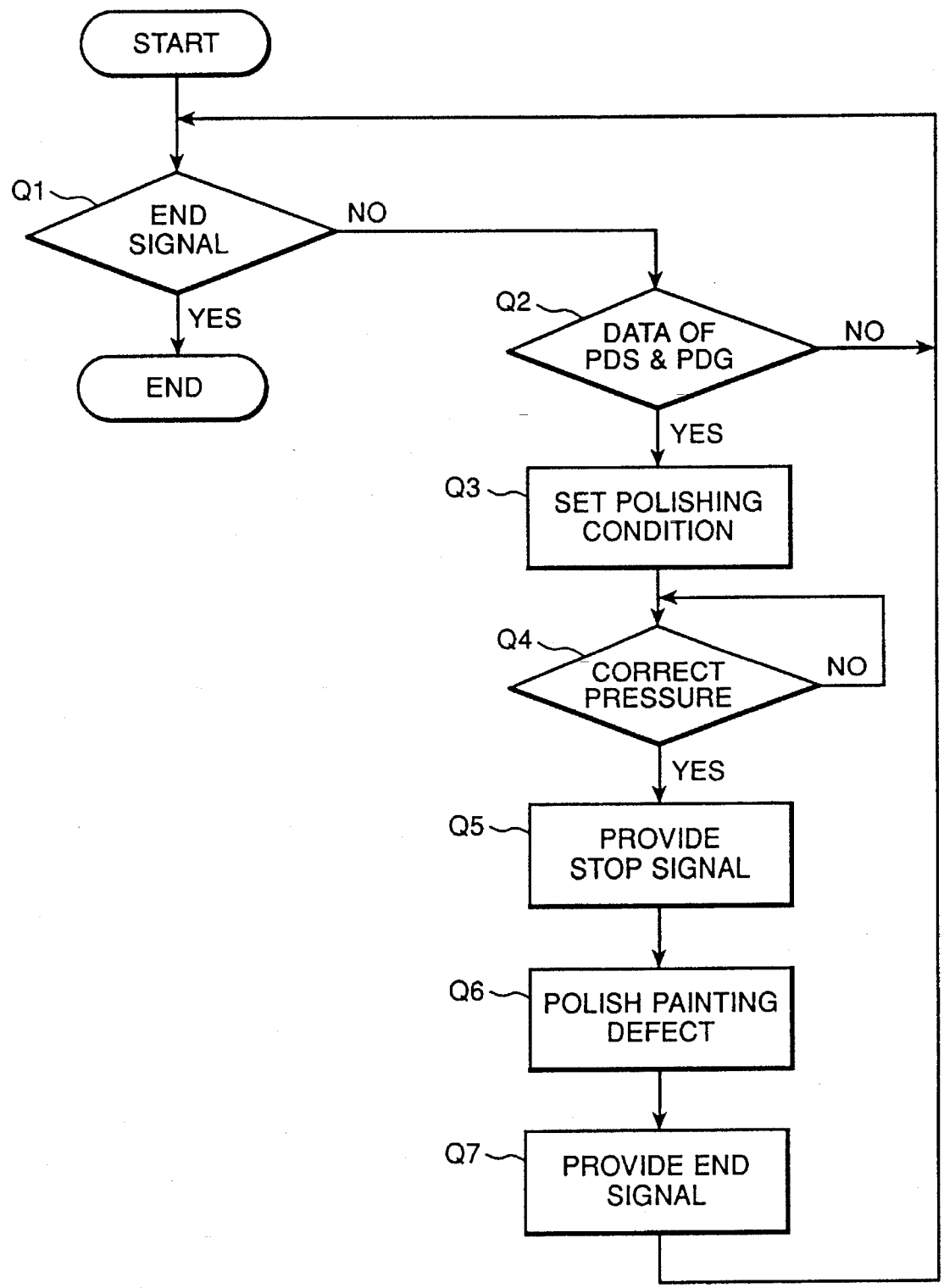
FIG. 11 is a flow chart illustrating a polishing tool control sequence routine.

The operation of the surface polishing manipulator shown in FIGS. 1 to 5 is best understood by reviewing FIGS. 9 to 11, which are flow charts illustrating various routines for the microcomputers of the control units 71 to 79 of the controller 70. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Because all of the surface polishing manipulators R1, R2 and R3 are operated in the same manner, the following description will be directed to the upper surface polishing manipulator R1 only. It is to be noted that the respective sequence routines start when the control unit 70 receives a vehicle model signal for a vehicle body B, placed on the chain conveyor 1 in a predetermined position at the vehicle model judging station L1, from the vehicle model judging unit 62. It should also be noted that the upper surface polishing manipulator R1 is kept in its original position, which is almost at the middle of the rail 5 as viewed in the lengthwise or X direction.

FIGS. 9A and 9B are flow charts for the sequence routine of the microcomputer of the manipulator control unit 71. The first step S1 of the sequence routine is to perform mechanical and electronic initialization of all elements upon the provision of a vehicle model signal from the vehicle model judging unit 62. For initialization, the servo motors 15 and 16 of the upper surface polishing manipulator R1 are actuated and move the polishing units 12 appropriately in X, Y and Z directions according to the vehicle model determined by the vehicle model judging unit 62. This enables the image pickup devices 30 to scan the subdivisions SA1, SA2 and SA3 of the surface of the hood BN, respectively. The initialization further includes resetting a soft timer and a counter of the control unit 70. The soft timer is provided for determining a shift timing at which the image pickup devices 30 are actually shifted or moved to image pickup positions. The counter is provided for counting the number of actual movements of the image pick-up devices 30 to image pickup positions. The interval between adjacent shift timings is determined by a relative speed between the chain conveyor 1 and the upper surface polishing manipulator R1. For determining each timing, the soft timer counts clock pulses. Shifting of the image pickup devices 30 is caused for every column of subdivisions.

After initialization, a decision is made at step S2 as to whether or not the vehicle body B is conveyed to a predetermined reference position (R position) at the automatic polishing station L2. As is shown by double dotted line in FIG. 1, the vehicle body B, in the reference position, has its front end placed at a predetermined distance upstream from the upper surface polishing manipulator R1, staying in the original position. The distance from the upper surface polishing manipulator R1 of the front end of the vehicle body B may be found by counting conveying pulse signals, actually provided by the conveyor control unit 61, from when the vehicle model judging unit 62 provides a vehicle model signal. Until the vehicle body B has been conveyed to the reference position or, in other words, until the answer to the decision made at step S2 becomes "YES," the decision is repeated.

Figure 7:
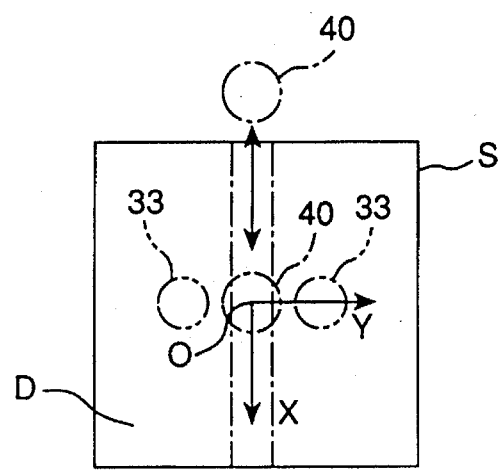
FIG. 7 is an illustration of an image area showing a two-dimensional rectangular coordinate.

When the answer to the decision made at step S2 becomes "YES," the servo motor operated rack and pinion mechanism is actuated at step S3 so as to move the upper surface polishing manipulator (USPM) R1 in a direction opposite to the X-direction at a constant speed. The constant speed is determined based on the vehicle model of the vehicle body B and the speed of the chain conveyor 1. Simultaneously, the side surface polishing manipulators R2 and R3 are moved in the same direction and at the same speed as the upper surface polishing manipulator R1. Immediately before the vehicle body B is located right below the upper surface polishing manipulator R1, the servo motors 15 and 16 are actuated so as to adjust the height and position of the image pickup devices (IP devices) 30 of the upper surface polishing manipulator R1 according to the surface configuration of the vehicle body B at step S4. Then, a decision is made at step S5 as to whether or not it is time to position the image pickup devices 30 of the upper surface polishing manipulator R1 near image pickup positions. If the answer to the decision made at step S5 is "NO," the image pickup devices 30 of the upper surface polishing manipulator R1 are still far from the subdivisions SA1, SA2 and SA3, respectively. The decision made at step S5 is repeated until the answer becomes "YES." As soon as the answer becomes "YES," the servo motor 25 is actuated so as to position the image pickup devices 30 of the upper surface polishing manipulator R1, including the illumination light sources 31 and the CCD cameras 33, closer to the image pickup positions at step S6. The counter then changes its count (i) by one increment at step S7. As will be described later, the image pickup control and processing unit 74 provides a stop signal if it detects a painting defect D (see FIGS. 6 and 7) in any one of the respective subdivisions SA1, SA2 and SA3 of the surface of the hood BN of the vehicle body B. At step S8, a decision is made as to whether or not a stop signal is provided. When there is no stop signal, this indicates that there is no painting defect in any the first column subdivisions SA1, SA2 and SA3 of the surface of the hood BN. Then, a decision is made at step S9 as to whether or not the counter has counted the predetermined number N of positionings of the image pickup devices 30 to image pickup positions; such positionings are conducted at step S6. As was previously described, the predetermined number of movements of the image pickup devices 30 is equal to the number of columns of subdivisions S into which the whole upper surface of the vehicle body B is divided. Until all of the columns of subdivisions S of the whole upper surface of the vehicle body B have been examined, the answer to the decision made at step S9 is "NO." As long as the answer to the decision made at step S9 is "NO," the steps from step S5 to step S8 are repeated.

FIG. 10 is a flow chart illustrating the sequence routine for the microcomputer of the image pick-up control and processing unit 74. The first step P1 is to initialize or reset a soft timer and a counter when a vehicle model signal is provided. After initialization, the illumination light sources 31 of the image pickup devices 30 of the upper surface polishing manipulator R1 are energized to illuminate the first column subdivisions SA1, SA2 and SA3 of the surface of the hood BN at step P3 once the air cylinders 35 are activated so as to open the shutter 34 and the CCD cameras 33 at step P2. Then, a decision is made at step P4 as to whether or not it is time to pick up images of the first column subdivisions SA1, SA2 and SA3. If the answer to the decision made at step P4 is "NO," it is too early to pick up images representative of the first column subdivisions SA1, SA2 and SA3. The decision made at step P4 is repeated until the answer becomes "YES." As soon as the answer to the decision made at step P4 becomes "YES," the CCD cameras 33 are activated at step P5 to pick up images of the first column subdivisions SA1, SA2 and SA3. After changing the count (i) of the counter by one increment at step P6, image processing is conducted at step P7. That is, after video signals from the CCD cameras 33 of each of the first column subdivisions SA1, SA2 and SA3 are transformed or converted to binary signals, the video signals are analyzed to detect a subsection including a painting defect D (PDS), a grade of the painting defect D (PDG), a position or coordinate of the painting defect D (PDP), etc., in a manner as will be described later or, alternatively, in a manner which is well known in the image processing and analysis art.

Based on the result of image analysis, a decision is made at step P8 as to whether or not each of the first column subdivisions has a painting defect D. If there is no painting defect in any of the first column subdivisions SA1, SA2 and SA3, then, a decision is made at step P15 as to whether or not the counter has counted the predetermined number of images N picked up by each of the image pickup devices 30 at step P5. As was previously described, the predetermined number of images picked up is equal to the number of columns of subdivisions S. Until the last column of subdivisions S of the upper surface of the vehicle body B has been examined, the answer to the decision made at step P15 is "NO "and the steps from step P4 to step P9 are repeated.

If in fact there is a painting defect D in any of the first column subdivisions SA1, SA2 or SA3, the answer to the decision made at step P8 becomes "YES." Then, a stop signal is provided and sent to the manipulator control unit 71 at step P9.

FIG. 11 is a flow chart illustrating a sequence routine for the microcomputer of the polishing control unit 77. When a vehicle model signal is provided, a decision is made at step Q1 as to whether or not there is an end signal provided from the manipulator control unit 71, which will be described later, as a result of having conducted automatic polishing for all of the subdivisions S of the upper surface of the vehicle body B. If in fact there is an end signal, the answer to the decision made at step Q1 becomes "YES." Then, the automatic painting defect polishing sequence routine is terminated. However, if there is no end signal, the answer to the decision made at step Q1 is "NO." Another decision is then made at step Q2 as to whether or not input painting defect data is present for a subdivision in which a painting defect D exists and for a grade of the painting defect D; this data is provided from the image pickup control and processing unit 74. The decision is repeated until the data is input.

Referring back to FIG. 9, if painting defects do not exist in any subdivision S, if the answer to the decision made at step S9 becomes "YES," the predetermined number of movements N to image pick up positions of the image pickup devices 30 has been conducted. Then, after providing an end signal to the polishing control units 77 at step S10, and actuating the servo motor operated rack and pinion mechanism so as to move the upper surface polishing manipulator R1 in the X-direction to the original position at step S11, the sequence routine ends.

Simultaneously with the progress of the manipulator control sequence routine, in the image pickup control and processing sequence routine, if the answer to the decision made at step P15 becomes "YES," this indicates that the predetermined number of images N have been picked up by each of the image pickup devices 30 at step P5. Then, after the illumination light sources 31 of the image pickup devices 30 of the upper surface polishing manipulator R1 are deenergized at step P16, and the air cylinders 35 are deactuated to move the shutter blades 34 to their closed positions for concealing the CCD cameras 33 in the casings 32 at step P17, the image pickup control and processing sequence routine is ended. On the other hand, the polishing control sequence routine is ended when an end signal is provided.

If any one of the subdivisions S includes a painting defect D, the answer to the decision made at step P8 becomes "YES," and a stop signal is provided at step P9 in the image pickup control and processing sequence routine. As a result, the answer to the decision made at step S8 in the manipulator control sequence routine becomes "YES." Then, the servo motor operated rack and pinion mechanism is deactivated so as to stop the upper surface polishing manipulator R1 from moving in the direction opposite to the X-direction at step S12. Subsequently, the servo motor operated rack and pinion mechanism is activated again to move the upper surface polishing manipulator R1 quickly in the X-direction so as to shift the image pickup devices 30 toward the image pickup position in which they pick up images representative of the first column subdivisions SA1, SA2 and SA3 at step S13. When an image pickup device 30 reaches the image pickup position, the servo motor operated rack and pinion mechanism continuously moves the upper surface polishing manipulator R1 in the X-direction in synchronism with the chain conveyor 1 at step S14. Simultaneously, the hydraulic cylinders 51 are actuated to move the polishing tools (PT) 40 toward their protruded positions from their retracted or original positions at step S15. Then, a decision is made at step S16 as to whether or not the painting defect data of a subdivision including a painting defect D and the coordinate of the painting defect D is input from the image pickup control and processing unit 74. The decision is repeated until the answer to the decision made at step S16 becomes "YES." While the upper surface polishing manipulator R1 is moving in the X-direction so as to shift the image pickup devices 30 to the image pickup position in which they pick up images representative of the first column subdivisions SA1, SA2 and SA3 through steps S13 and S14 and the polishing tools 40 are moving toward their original positions from their retracted positions at step S15, in the image pickup control and processing sequence routine, the illumination light sources 31 of the image pickup devices 30 of the upper surface polishing manipulator R1 are deenergized at step P10. The air cylinders 35 are deactuated to move the shutter blades 34 to their closed positions for concealing the CCD cameras 33 in the casings 32 at step P11. Subsequently, after painting defect data, such as that representing a subdivision including a painting defect D, a grade of the painting defect D and the coordinate of the painting defect D, is provided at step P12, the painting defect data representative of the painting defect, including the subdivision and the coordinates of the painting defect D, is sent to the manipulator control unit 71 at step P13. The painting defect data representative of the painting defect, including the subdivision and the grade of the painting defect D, is sent to the polishing control unit 77 at step P14.

As soon as the painting defect data is input at step S16, the servo motors 28, assigned to subdivisions other than subdivisions not including any painting defects and a first subdivision in the same column including a painting defect D, are actuated so as to turn the spindles 51a of the hydraulic tailstocks 51, and hence the polishing tools 40, about the center axes of the spindles 51a through a right angle at step S17. For example, as shown in FIG. 6, if the first and second subdivisions SA1 and SA2 include painting defects D, respectively, the servo motors 28, assigned to the second and third subdivisions SA2 and SA3, are actuated so as to turn the spindles 51a of the hydraulic tailstocks 51, and hence the polishing tools 40, about the center axes of the spindles 51a through a right angle at step S17. However, if the first and third subdivisions SA1 and SA3 do not include any painting defects, then the servo motors 28 assigned to the first and third subdivisions SA1 and SA3 are actuated so as to turn the spindles 51a of the hydraulic tailstocks 51 thereof. Subsequently, the servo motor operated rack and pinion mechanism and the servo motor 16 are actuated to shift the polishing tool 40 so as to align the center line of the polishing tool 40 with a vertical line passing through the painting defect D in the first column, first row subsection SA1 at step S18. Simultaneously, in the automatic painting defect polishing sequence routine, when there is painting defect data representative of the painting defect, including the subdivision and the grade of the painting defect D, and the answer to the decision made at step Q2 is "YES," polishing conditions, including the speed of rotation of the polishing pad 41 and the polishing pressure of the polishing pad 41, are established based on the painting defect data.

Once the polishing tool 40, assigned to the first painting defect including subdivision SA1, has reached a position just above the painting defect D, the servo motor 15 is actuated initially at a high speed so as to lower the polishing tool 40 down toward the surface of the hood BN of the vehicle body B at step S19. When the polishing tool 40 has been lowered down a predetermined vertical distance, the servo motor 15 is slowed down so as to slowly lower the polishing tool 40 toward the surface of the hood BN of the vehicle body B at step S20. When the answer made at step S21 becomes "YES," the polishing control unit 77 provides a down-stop signal. As will be described later, the down-stop signal is provided when the pressure sensor 43 detects that there is a predetermined polishing pressure against the painting defect D of the hood BN of the vehicle body B. If in fact the answer to the decision made at step S21 is "YES," the servo motor 15 is then stopped at step S22 so as to maintain the predetermined polishing pressure against the painting defect D. Until it is detected at step S23 that a polish-end signal is provided from the polishing control unit 77 at step Q7 in the painting defect polishing sequence routine, the polishing tool 40 is kept ready for polishing.

The predetermined polishing pressure against the painting defect D of the hood BN of the vehicle body B is detected by the pressure sensor 43 at step Q4 so that a down-stop signal is provided at step Q5 to the manipulator control unit 71 in the automatic painting defect polishing sequence routine. While the servo motor 15 is stopped so as to maintain the predetermined polishing pressure against the painting defect D at step S22 in the manipulator control sequence routine, the painting defect D is polished under the polishing conditions previously established based on the grade of the painting defect D at step Q6. Immediately after polishing of the painting defect D is completed, a polish end signal is provided to the manipulator control unit 71 from the polishing control unit 77 at step Q7. Until an end signal is provided from the manipulator control unit 71, the painting defect polishing sequence routine is periodically repeated.

When a polish-end signal is provided from the polishing control unit 77 at step Q7 in the painting defect polishing sequence routine, the answer to the decision made at step S23 becomes "YES." Then, after the polishing tool 40 assigned to the polishing defect including subdivision SA1 has been returned to its original position at step S24, all of the remaining polishing tools 40 are returned to their original positions at step S25. Subsequently, a decision is made, based on the painting defect data representative of painting defect including subdivisions, at step S26 as to whether or not all of the painting defects in the first column subdivisions have been polished out. The sequence is performed for all other painting defects in the first column subdivisions in the same manner. Accordingly, until all of painting defects in the first column subdivisions are polished out, the steps at S17 through S26 are repeated. If the answer to the decision made at step S26 is "YES," all of painting defects in the first column subdivisions have been polished out. Then, after the hydraulic cylinders 51 are actuated so as to return all of the polishing tools 40 to their retracted positions at step S27, a decision is made at step S28 as to whether or not the counter has counted the predetermined number of movements N of the image pickup devices 30 to image pickup positions. If the answer to the decision made at step S28 is "NO," then the steps at S3 through S9 and S12 through S28 are repeated for the remaining column subdivisions. However, if the answer to the decision made at step S28 is "YES," painting defects D in all columns of the subsections have been polished out. Then, an end signal is provided to the polishing control unit 77 at step S10. Subsequently, the upper surface polishing manipulator R1 is returned to its original position at step S11 so as to end all operations at the automatic polishing station L2.

Figure 12:
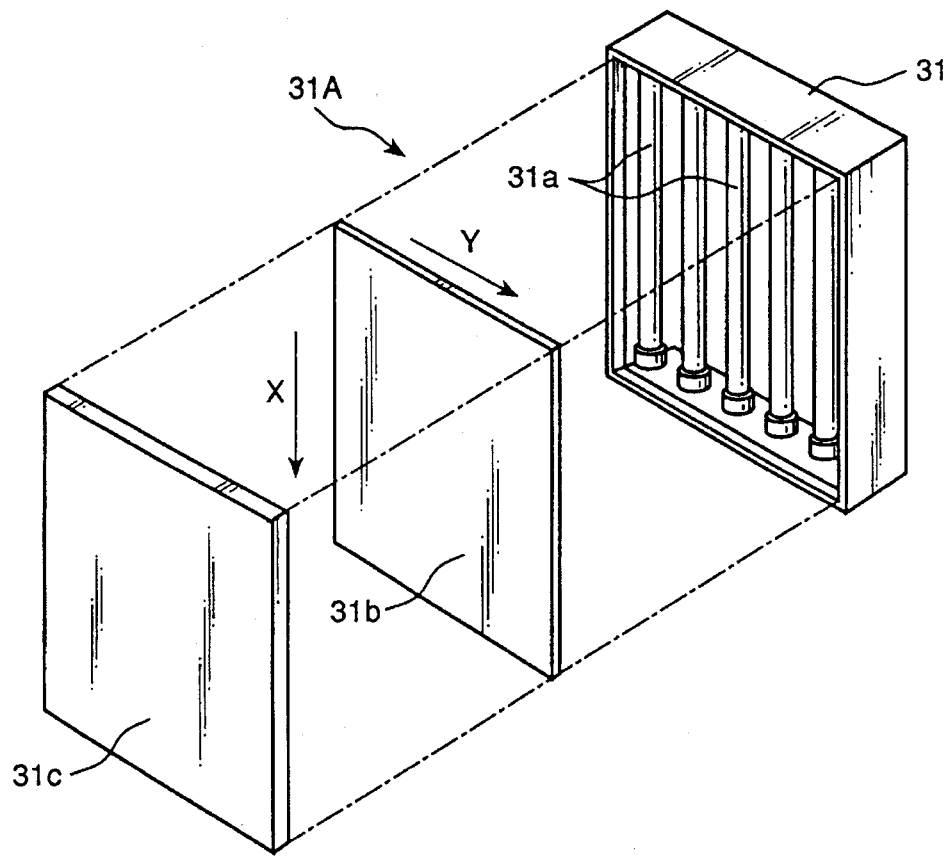
FIG. 12 is an exploded perspective view of an illumination light source of an image pickup device.
Figure 13:
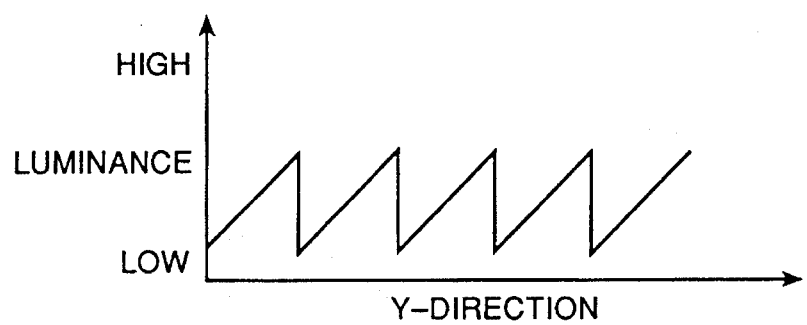
FIG. 13 is a graph showing a luminance pattern.

FIG. 12 illustrates an example of the light source 31A of the image pickup device 30. A generally box-shaped casing 31 includes a plurality of light bulbs, such as fluorescent lamps 31a, arranged in parallel in the Y-direction. The fluorescent lamps 31a are covered by a transmitting filter 31b and a transmitting diffusion screen 31c. The transmitting filter 31b is different in transmittance in the Y-direction only so as to provide a luminance distribution in which a change at a predetermined luminance gradient is repeated in the Y-direction as shown in FIG. 13; otherwise a sharp change between bright and darkness is repeated in the Y-direction. The transmitting diffusion screen 31c diffuses the illumination light, having the repetitive pattern of bright and darkness, so as to illuminate the surface of the vehicle body B uniformly in the Y-direction. If the vehicle body B has a curved surface, it reflects the illumination light toward the CCD camera 33 in different proportions according to positions of the curved surface. The luminance gradient at an image plane of the CCD camera 33, therefore, is changed greatly, and the detecting geometry accuracy of a painting defect is lowered. In order to avoid such a decrease in the accuracy of painting defect detection, the difference in reflected light amount and the transmitting diffusion screen 31c is designed and adapted to provide a luminance distribution having a luminance gradient corresponding to the curve at which the repetitive change in luminance is provided.

Figure 14:
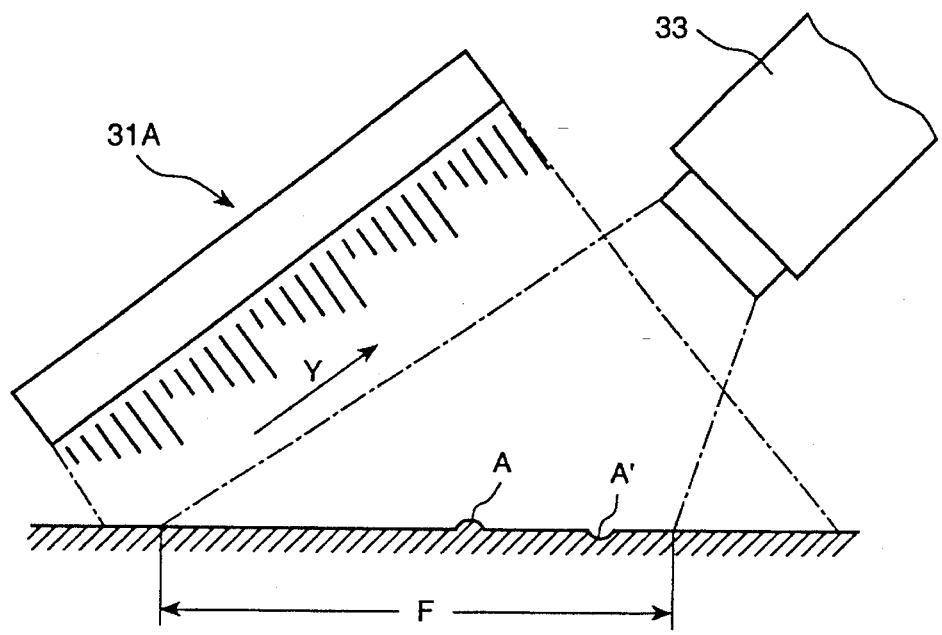
FIG. 14 is an illustration of a surface illuminated by the illumination light source and picked up by the image pickup device.
Figure 15:
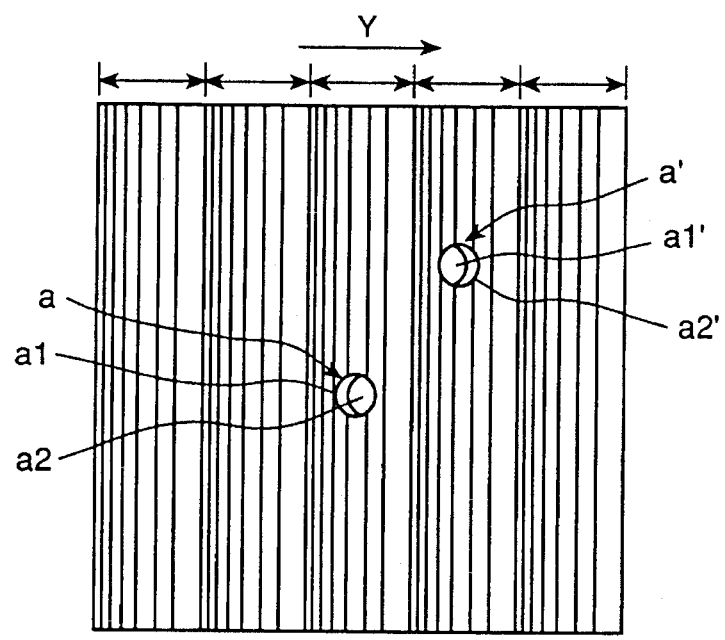
FIG. 15 is a plan view showing an illumination pattern on a surface including surface defects.

In FIGS. 14 and 15, the light source 31A illuminates the entire area F of a visual field of the CCD camera 33. The illumination pattern, as shown in FIG. 15, includes a plurality of illumination regions I arranged side by side in the Y-direction. In each of the illumination regions I, luminance changes from dark (shaded densely) to bright (shaded lightly). If there are convex and concave painting defects A and A' on the surface covered in the area F, the convex painting defect A and the concave painting defect A' form illumination spots a and a', respectively. Each of the spots a and a' consists of a dark shade (a1, a2') and an adjacent bright shade (a2, a1'). The spots of the convex painting defect A and the concave painting defect A' are in reverse order and change from bright to dark in the Y-direction. The CCD camera 33 picks up images of the dark and bright spots to provide video signals to the image pickup control and processing unit 74.

Figure 16:
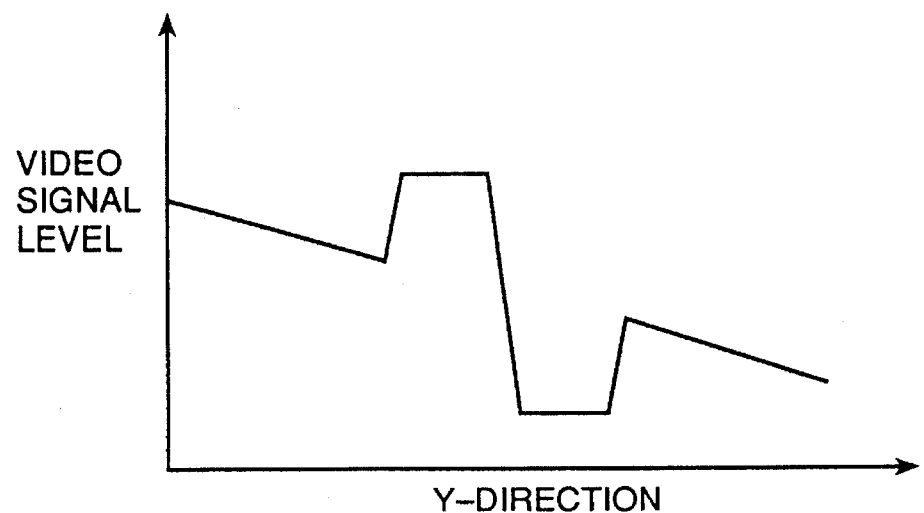
FIG. 16 is a graph showing a video signal level for a concave surface defect.
Figure 17:
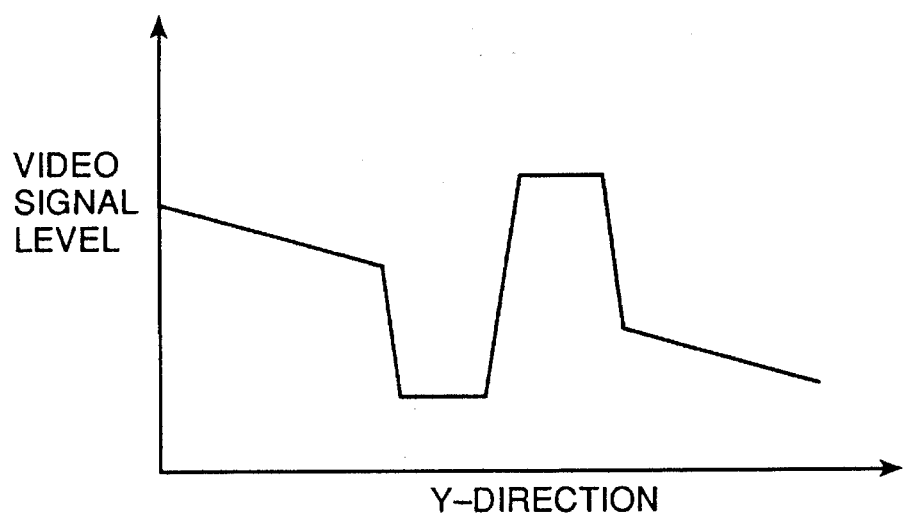
FIG. 17 is a graph showing a video signal level for a convex surface defect.

The video signal exhibits a pattern of change in signal level as shown in FIG. 16 for the concave painting defect A or as shown in FIG. 17 for the convex painting defect A'. Accordingly, based on the pattern of change in signal level of video signals provided from the CCD camera 33, a painting defect is geometrically analyzed and recognized in position, size and depth. Data representative of the position, size and depth of a painting defect is sent to the manipulator control units 71 and the polishing control units 77 through the image pickup control and processing unit 74. Illuminating the surface of the vehicle body B by light which repeatedly changes in brightness from bright to dark allows precise detection of painting defects with high accuracy.

Figure 18:
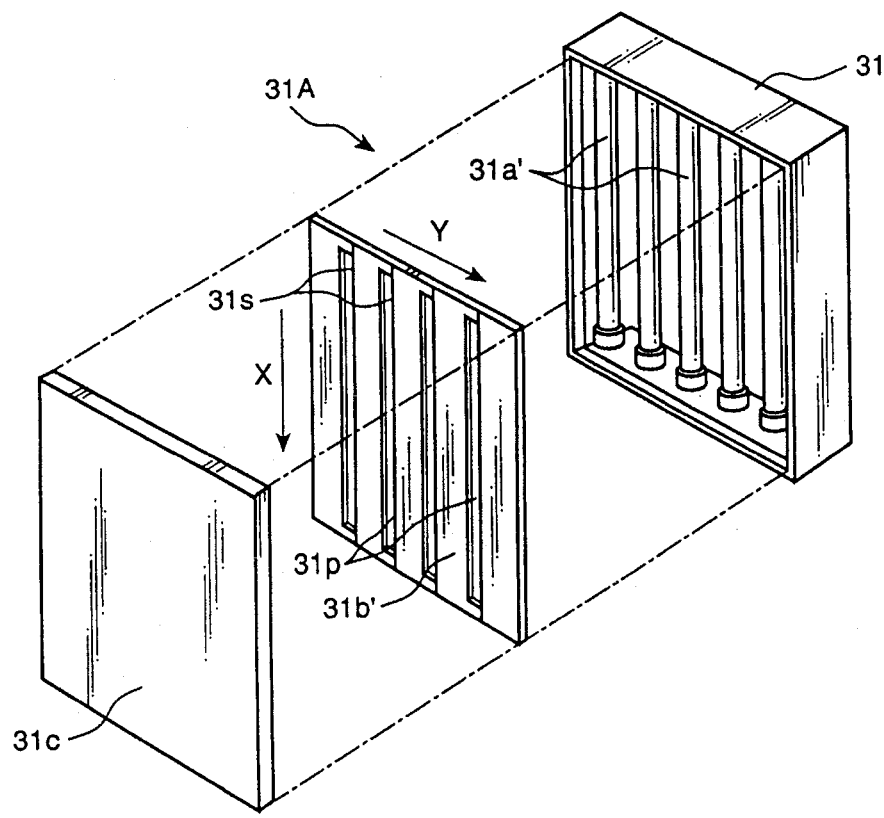
FIG. 18 is an exploded perspective view of another illumination light source of an image pickup device.
Figure 19:
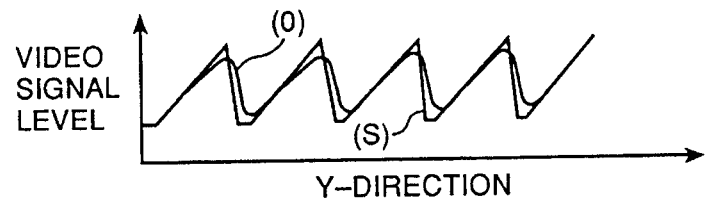
FIGS. 19 and 20 are graphs showing luminance patterns provided by the illumination light source shown in FIG. 18.
Figure 20:
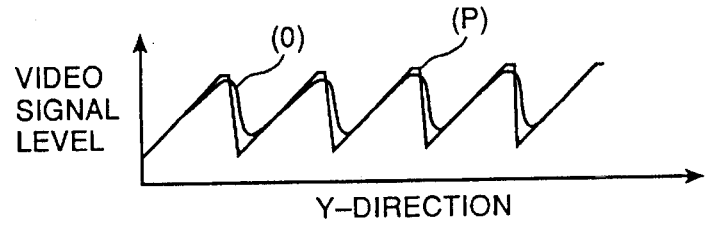

In order to avoid the bright portion and the dark portion of illumination from having an effect on each other so as to lower a luminance gradient of illumination in the Y-direction, the transmitting filter 31b may be modified so as to enhance sharp change, i.e., contrast, between dark and bright illumination portions as shown in FIG. 18. A transmitting filter 31b' basically has the same transmittance pattern as the transmitting filter 31a shown in FIG. 12. However, the transmitting filter 31b' is formed with a light shield stripe 31s extending in the X-direction along a transitional border between the highest transmittance and the lowest transmittance so as to enhance a sharp transition in brightness from bright to dark as shown by a line S in FIG. 19. If the light shield stripe 31s is not formed in the transmitting filter 31b', a transition in brightness from bright to dark is sluggish, as shown by a line O in FIG. 19. Further, the transmitting filter 31b' may be formed with a slit 31p extending in the X-direction along a transitional border between the highest transmittance and the lowest transmittance so as to enhance a sharp transition in brightness from bright to dark as shown by a line P in FIG. 20. If the slit 31p in the transmitting filter 31b' is not formed, a transition in brightness from bright to dark is sluggish as shown by a line O in FIG. 20. It is to be understood that the transmitting filter 31b' may be formed with either or both of the light shield stripe 31s and the slit 31p.

Figure 21:
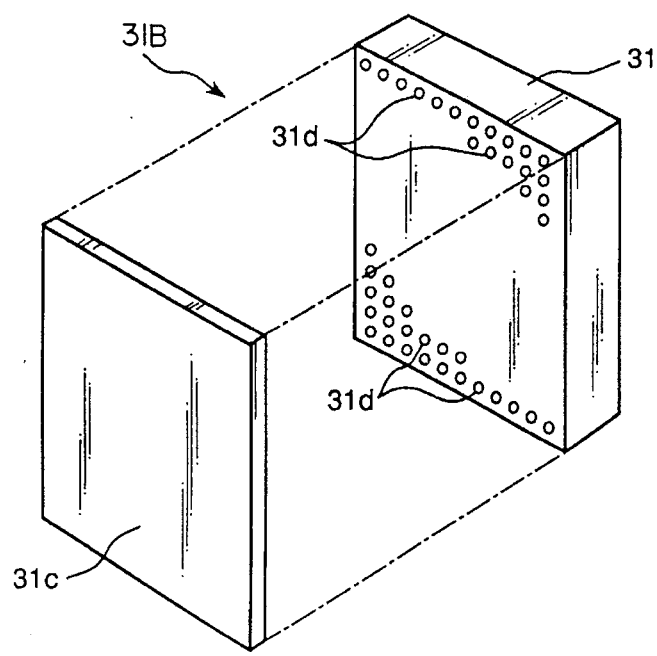
FIG. 21 is an exploded perspective view of still another illumination light source of an image pickup device.

In place of the fluorescent lamps 31a and the transmitting filter 31b having a transmittance distribution pattern in which transmittance changes repeatedly at a predetermined constant gradient, a variable luminance gradient light source may be used. As shown in FIG. 21, a light source 31B of the image pickup device 30 includes a number of point light sources, such as light emitting diodes (LEDs) 31d, arranged in a matrix pattern in a generally box-shaped casing 31. The light emitting diodes 31d are covered by a transmitting diffusion screen 31c. The light emitting diodes 31d are variable in luminance intensity so as to provide a luminance distribution in which a luminance change at a desired luminance gradient is repeated in the Y-direction.

Figure 22:
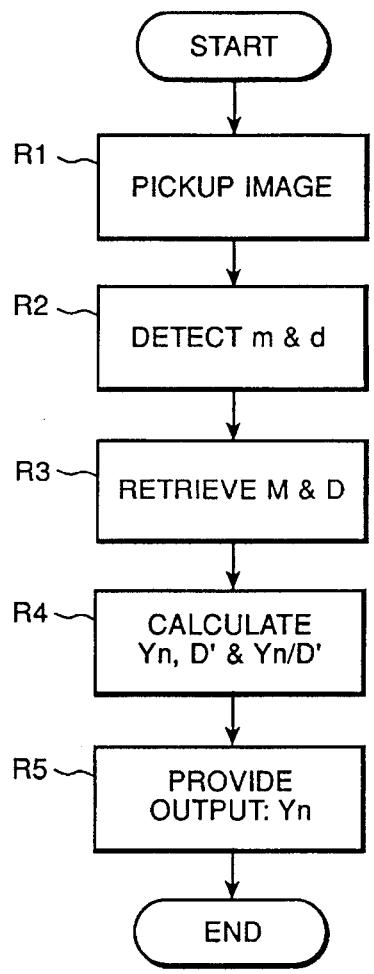
FIG. 22 is a flow chart illustrating a luminance control sequence routine.

The operation of the variable luminance gradient light source 31B depicted in FIG. 21 is best understood by reviewing FIG. 22, which is a flow chart illustrating a routine for the microcomputers of each of the image pickup control and processing units 74 to 76. Programming a computer is a skill well understood in the art.

Figure 23:
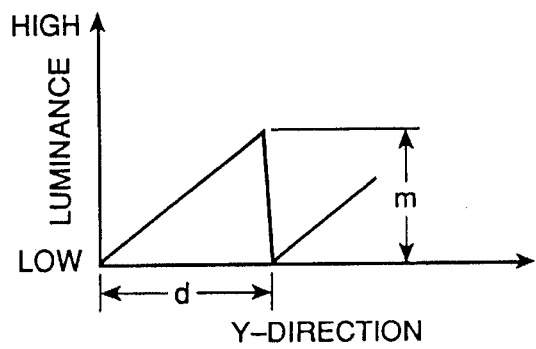
FIG. 23 is a graph showing a luminance gradient at which an illumination pattern on a surface actually changes.
Figure 24:
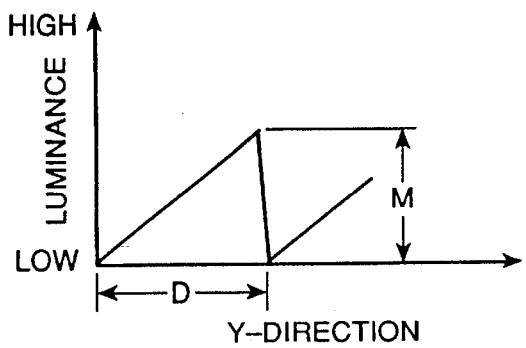
FIG. 24 is a graph showing an intended luminance gradient at which an illumination pattern on a surface changes.

FIG. 22 illustrates a luminance intensity control sequence routine. After reading in video signals of a subsection S of the surface of the vehicle body B provided by the CCD camera 33 at step R1, an actual distance d for each luminance change on the surface of the vehicle body B between the brightest to the lowest and an actual luminance difference m between the brightest to the lowest in the actual distance d, which are shown as an example in FIG. 23, are calculated based on the video signals at step R2. Thereafter, a standard distance D and a standard luminance difference M predetermined for the model of the vehicle body B, as shown in FIG. 24, are retrieved at step R3. Based on these distances d and D and luminance differences m and M, a target luminance gradient is calculated for each of the actual distance d and the luminance difference m at step R4. The target luminance gradient Yn/D' is obtained as a ratio of a corrected output power Yn of the power source to the light emitting diodes 31d for each column n relative to a corrected distance D' which are calculated from the following formulas, respectively.

$Yn = M/m \times yn$; and $D' = D/d \times d'$;

wherein yn is an actual output power of the power source to the light emitting diodes 31d for each column n and d' is an actual distance in which several columns of the light emitting diodes 31d necessary to provide each luminance change on the surface of the vehicle body B between the brightest to the lowest are included. Then, at step R5, the light emitting diodes 31d in each unit distance D' are energized by an output power Y varying at the gradient Yn/D'. This luminance intensity control sequence routine is performed in the step at step P2 of the image pickup control and processing sequence routine shown in FIG. 10.

In place of arranging the light emitting diodes 31d in a matrix pattern directly in the casing 31 of the light source 31B, one end of each of a plurality of flexible glass fibers, the other end of which is linked to a light emitting diode 31d, may be arranged in a matrix pattern in the casing 31.

Figure 25:
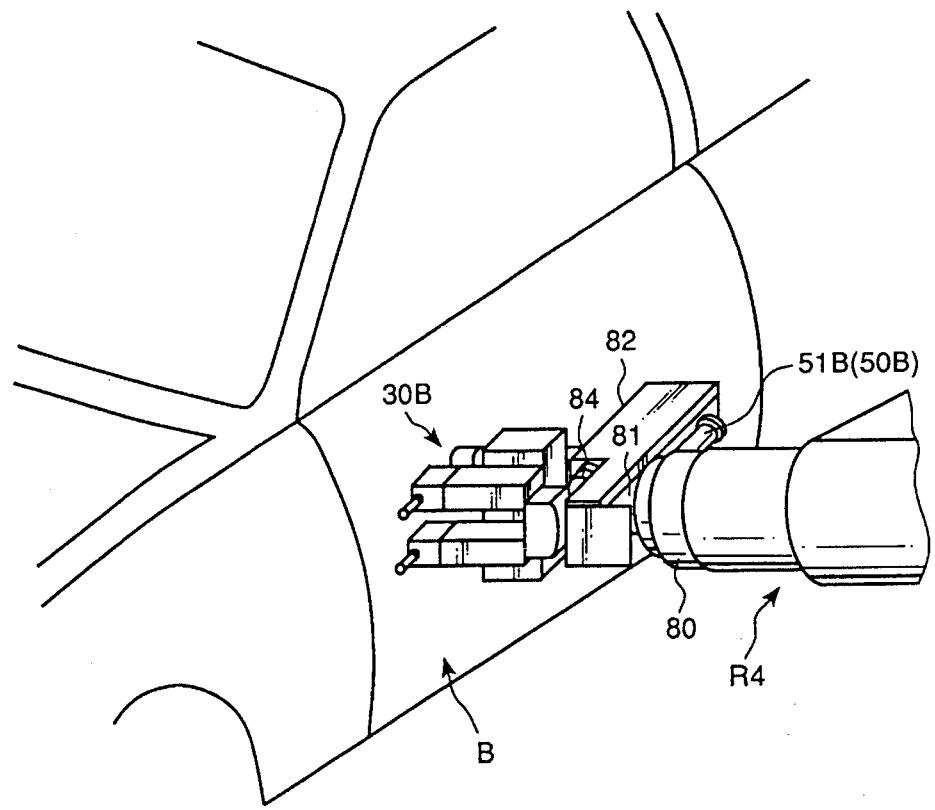
FIG. 25 is a perspective view of a side surface defect detecting and polishing manipulator of the surface polishing and finishing apparatus in accordance with another preferred embodiment of the present invention.
Figure 26:
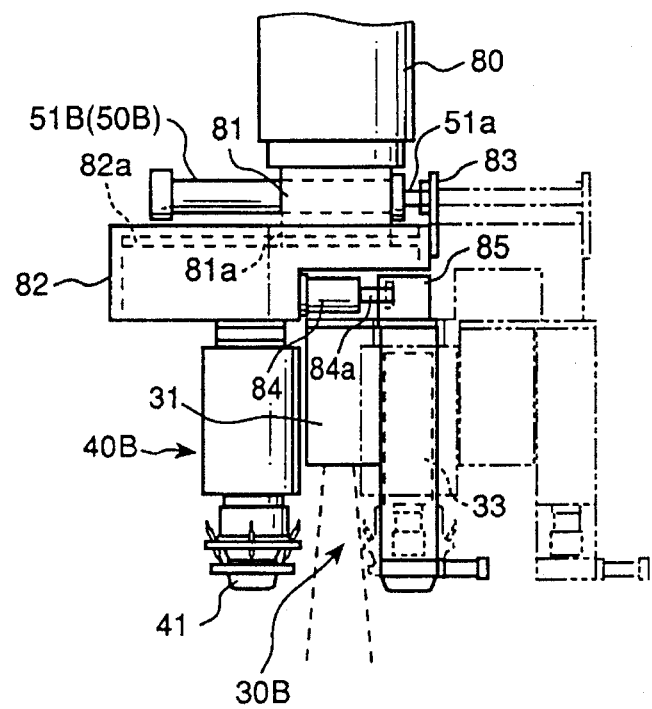
FIG. 26 is a front view of FIG. 25.

Referring to FIGS. 25 and 26, a multiply articulated arm robot or manipulator, such as a six-axis articulated arm manipulator R4, is shown. The robot or manipulator may be installed at the automatic polishing station L2 of the automobile manufacturing line L in place of each of the first to third surface polishing manipulators R1, R2 and R3 shown in FIG. 1. The six-axis articulated arm manipulator R4 has an arm 80. The arm 80 has a cross head 81, formed with a fastening block 81a to which a hydraulic cylinder 51B, forming a part of a shift and turn mechanism 50B, is attached. A tailstock 82, formed with a T-shaped groove 82a, is supported by the cross head 81 through an engagement of the block 81a of the cross head 81 with the T-shaped groove 82a so as to move relative to the cross head 81. The hydraulic cylinder 51B has a piston rod 51a connected to a bracket plate 83 secured to the tailstock 82. A motor 84, fastened to the tailstock 82, has an output shaft 84a which is attached with a mounting bracket 85. The tailstock 82 is secured with an image pickup device 30B by means of the mounting bracket 85 and directly with a polishing tool 40B so as to place them at almost equal distances from an upper surface of the vehicle body B to be monitored and polished. When the hydraulic cylinder 51B is actuated, the polishing tool 40B is moved between a retracted or rest position (shown by a solid line in FIG. 26) and a protruded or working position (shown by a double-dotted chain line in FIG. 26). On the other hand, when the motor 84 is actuated, the image pickup device 30B is turned from a working position about a center axis of the output shaft 84a of the motor 84 through a predetermined angle so as to occupy a rest position. As noted above, the rest position is shown by solid line in FIG. 26. If polishing of a painting defect is needed, the image pickup device 30B is turned to its rest position. Thereafter, the polishing tool 40B is moved to its working position.

In the above embodiment, although detecting of a painting defect and polishing of the painting defect take place for each row of subsections of a surface of the vehicle body B, polishing out of painting defects may be performed after having examined all of the subdivisions of a surface of the vehicle body B one after another.

Figure 27:
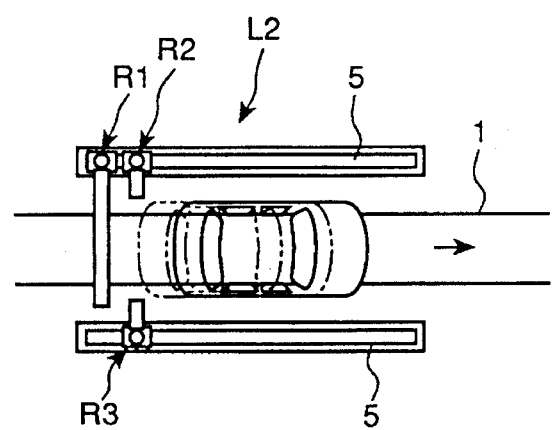
FIG. 27 is a schematic illustration showing an automatic polishing station.

FIG. 27 shows an automatic polishing station L2 in which an orthogonal coordinate type of first to third surface polishing manipulators R1, R2 and R3 is provided. The manipulators have original positions at or near upstream ends of rails 5 with respect to the direction of movement of a chain conveyor 1. Each of the surface polishing manipulators R1, R2 or R3 is moved in the same direction as the chain conveyor 1, namely, an X-direction. The manipulators are moved at a constant speed higher than a conveyor speed when images of subdivisions S of a surface of the vehicle body B are picked up consecutively in a row after another row. After having picked up images of all rows of the subdivisions S, subdivisions of the surface including painting defects are polished, one after another, while each surface polishing manipulator R1, R2 or R3 is moved in the X-direction at the same speed as the chain conveyor 1.

Figure 28:
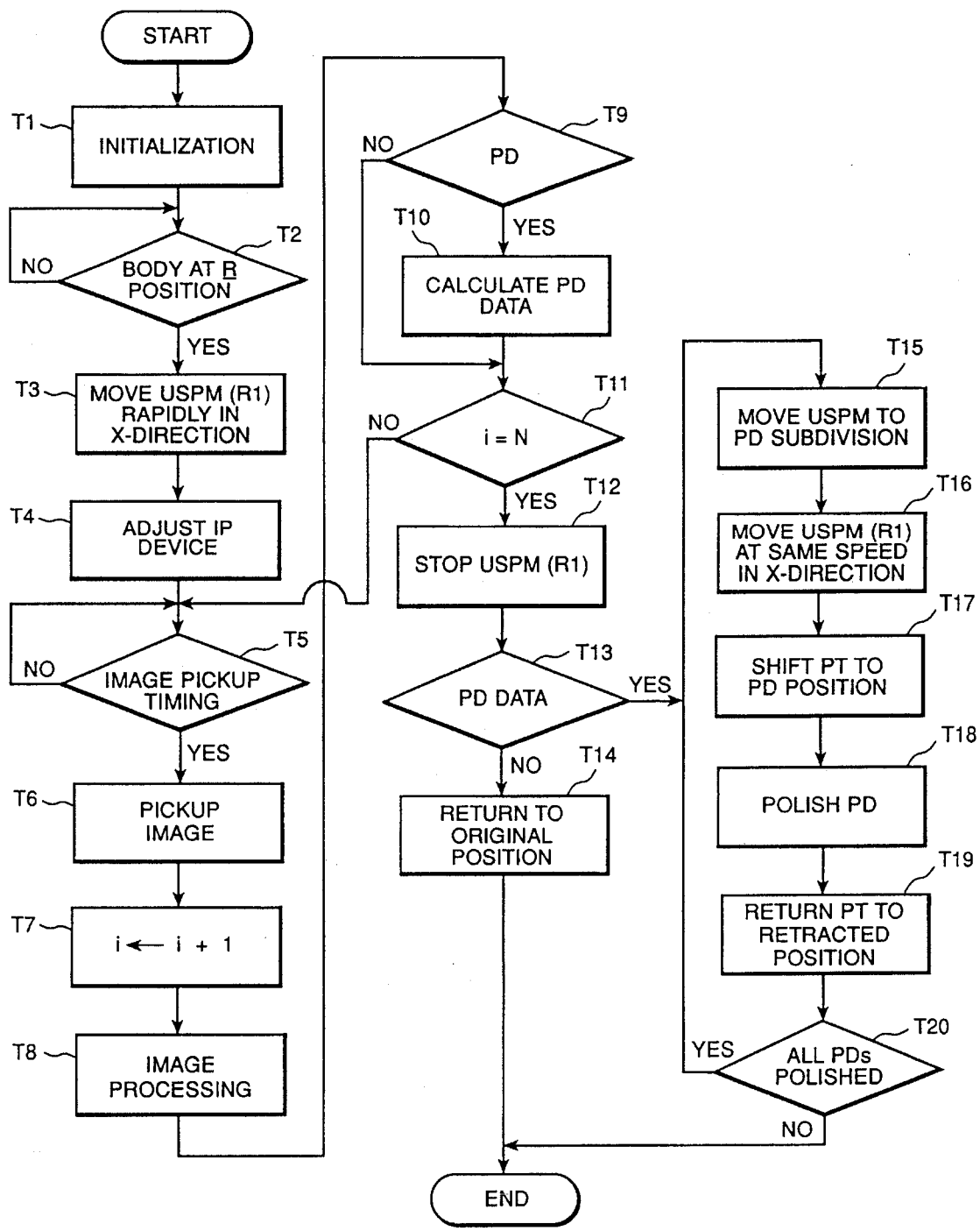
FIG. 28 is a flow chart illustrating a manipulator control sequence routine in accordance with another preferred embodiment of the present invention.

Referring to FIG. 28, which is a flow chart illustrating a painting defect detection and polishing control sequence routine, the first step T1 is to perform mechanical and electronic initialization of all elements upon the provision of a vehicle model signal from the vehicle model judging unit 62. For initialization, the servo motors 15 and 16 of the upper surface polishing manipulator R1 are actuated and move the polishing units 12 appropriately in X, Y and Z directions according to the vehicle model determined by the vehicle model judging unit 62. This enables the image pickup devices 30 to scan the subdivisions SA1, SA2 and SA3 of the surface of a trunk lid. Simultaneously, a soft timer and a counter of the control unit 70 are reset. After initialization, a decision is made at step T2 as to whether or not the vehicle body B is conveyed to a predetermined reference position at the automatic polishing station L2. Until the vehicle body B reaches the reference position, or as long as the answer to the decision is "NO," the first upper surface polishing manipulator R1 stays at the original position. As is shown by double dotted line in FIG. 27, the vehicle body B in the reference position has its rear end placed at a predetermined distance downstream from the upper surface polishing manipulator R1 in the original position.

When the answer to the decision made at step T2 becomes "YES," the servo motor operated rack and pinion mechanism is actuated so as to move the upper surface polishing manipulator R1 in the same direction as the chain conveyor 1 or in the X-direction at a constant speed higher than the chain conveyor 1 at step T3. The speed of the upper surface polishing manipulator R1 is determined based on the vehicle model of the vehicle body B and the speed of the chain conveyor 1 so that the manipulator does not go beyond but stays close to the front end of the vehicle body B when the vehicle body B reaches the middle of the automatic polishing station L2. The side surface polishing manipulator R2 and R3 are moved in the X-direction at the same speed as the upper surface polishing manipulator R1.

Immediately before the upper surface polishing manipulator R1 reaches a position right above the rear end of the vehicle body B, the image pick-up devices 30 of the upper surface polishing manipulator R1 is adjusted in height and position according to the surface configuration of the vehicle body B at step T4. The image pickup devices 30 of the upper surface polishing manipulator R1 is kept in the adjusted position until a time for picking up images of the subdivisions of the upper surface of the vehicle body B at step T5. When it is time to pick up images, after picking up images representative of a first row of subdivisions S at step T6, the counter changes its count (i) by one increment at step T7. Then, at step T8, image processing and analyzing takes place so as to detect a painting defect based on the video signals and provide data representative of the painting defect. At step T9, a decision is made, based on the painting defect data, as to whether or not there is a painting defect in any one of the first row of subdivisions. When a painting defect exists, painting defect data, such as a subdivision including a painting defect, a grade of the painting defect and the coordinate of the painting defect, is calculated and stored at step T10. Painting defects are classified into three grades; these grades are deep or large, medium, and small or shallow. When it is determined that there is no painting defect in any of the first row subdivisions as a result of the decision made at step T9 or after the calculation of the painting defect data at step T10, a decision is made at step T11 as to whether or not the counter has counted the predetermined number of images picked up by the image pickup devices 30. As was previously described, the predetermined number of images is equal to the number of rows of subdivisions S into which the whole upper surface of the vehicle body B is divided. Until images representative of all of the rows of subdivisions S of the whole upper surface of the vehicle body B have been picked up, the answer to the decision made at step T11 is "NO." As long as the answer to the decision made at step T11 is "NO," the steps from step T5 to step T11 are repeated.

When the answer to the decision made at step T11 becomes "YES," images representative of all rows of the subdivisions S have been picked up and painting defect data has been calculated for all existing painting defects over the whole upper surface of the vehicle body B. Then, the upper surface polishing manipulator R1 is stopped at step T12. At step T13, a decision is made as to whether or not there is painting defect data stored in the controller 71. If there is no painting defect data, the upper surface polishing manipulator R1 is returned to its original position, shown in FIG. 27, at step T14. Then, the painting defect detection and polishing control sequence routine ends. These steps T1 to T14 are performed for the side surface polishing manipulators R2 and R3 in the same way.

If there is painting defect data stored in the controller 71 and the answer to the decision made at step T13 is "YES," then, polishing steps T15 through T19 take place. That is, at step T15, the upper surface polishing manipulator R1 is moved based on the painting defect data so as to place the polishing tool 40 above a last subdivision S including a painting defect D (which is the first subdivision from the front end of the vehicle body B). The access to the subdivisions is made in reversed order of image pickup, namely, from the forward end row subdivisions to the rearmost end row subdivisions. The second side surface polishing manipulator R2 follows the first upper surface polishing manipulator R1, and the third side surface polishing manipulator R3 moves independently of the first upper surface polishing manipulator R1. Thereafter, once the speed of the upper surface polishing manipulator R1 is changed so that it moves at the same speed as the chain conveyor i in the X-direction at step T16, the polishing pad 41 of the polishing tool 40 is placed above a painting defect within the last subdivision S. The manipulator presses the pad 41 against the painting defect D with a pressure corresponding to a grade of the painting defect D, based on the painting defect data, at step T17. For moving and pressing the polishing pad 41 against the painting defect D, one of the hydraulic cylinders 51 assigned to the subdivision S including the painting defect D is actuated first so as to shift the polishing tool 40 to its standard original position. On the other hand, servo motors 28 of the polishing tools 40 assigned to the remaining subdivision S, other than the last subdivision S, are actuated so as to turn the corresponding polishing tools 40 through a right angle. Then, servo motors 15, 16 and 25 are actuated so as to move and press the polishing pad 41 against the painting defect D.

Subsequently, the motor 42 of the polishing tool 40 is actuated to turn the polishing pad 41 for polishing the painting defect D based on the painting defect data representative of the painting defect D at step T18. Finally, a decision is made at step T20 as to whether or not all of the painting defects D existing in the subdivisions S of the whole upper surface of the vehicle body B have been polished out. The steps from T15 through T20 are repeated until the answer to the decision made at step T20 is "NO" in order to polish out all of the painting defects D existing in the whole upper surface of the vehicle body B. If the answer to the decision made at step T20 becomes "YES," then after the upper surface polishing manipulator R1 is returned to its original position shown in FIG. 27 at step T14, the painting defect detection and polishing control sequence routine ends.

Figure 29:
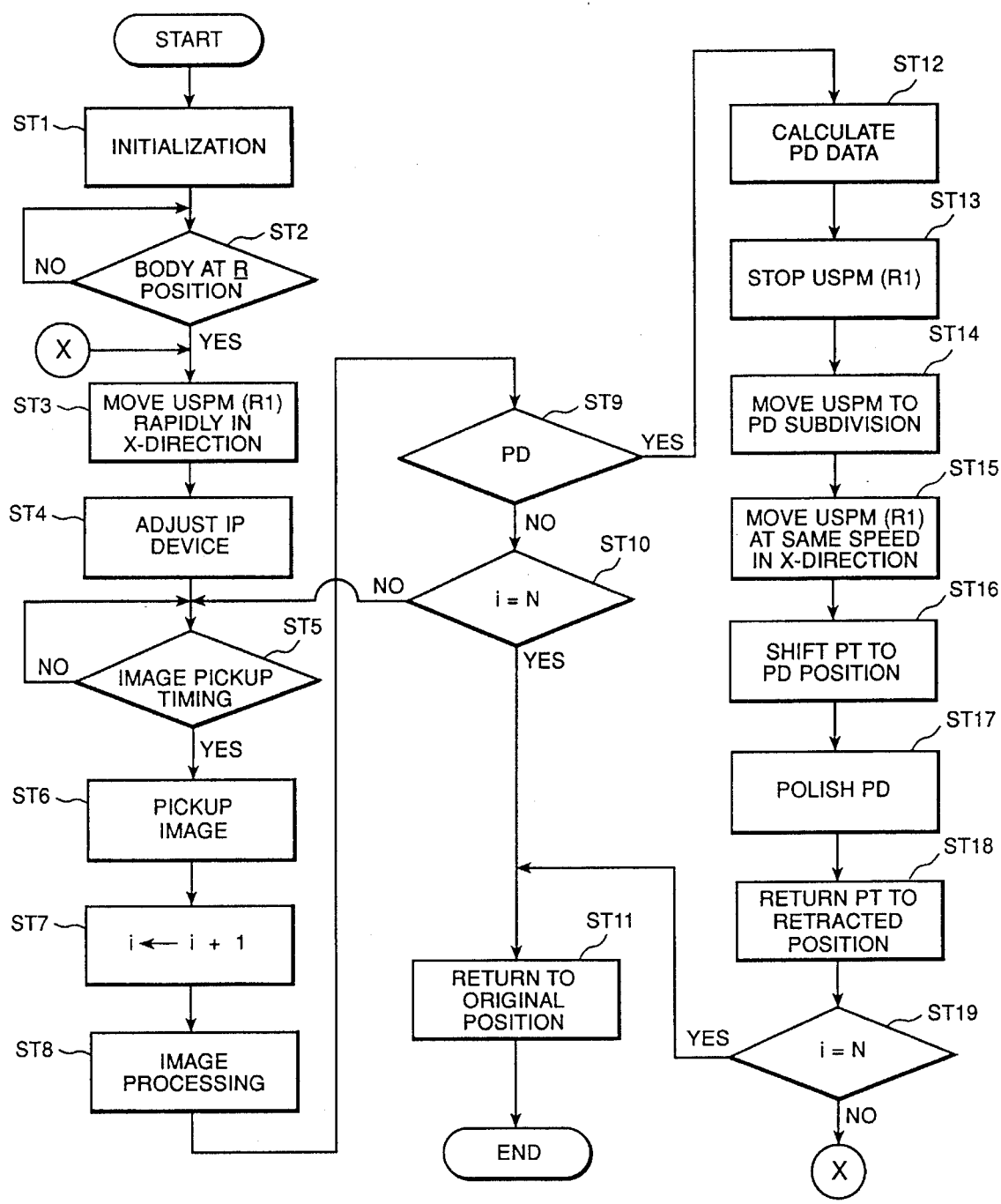
FIG. 29 is a flow chart illustrating a manipulator control sequence routine in accordance with a further preferred embodiment of the present invention.

FIG. 29 shows a flow chart which illustrates a variant of the painting defect detection and polishing control sequence routine described and illustrated in conjunction with FIG. 28. In this control sequence routine, detection of a surface defect and polishing of the surface defect are performed in the order of arrangement of all subdivisions one after another. Because steps ST1 through ST9 and ST14 through ST18 in the variation are identical to the steps T1 through T9 and T15 through T19 in the painting defect detection and polishing control sequence routine illustrated in FIG. 28, the following description will be directed only to steps which differ from those in the painting defect detection and polishing control sequence routine illustrated in FIG. 28.

As a result of the examination of the rear end column of subdivisions at step ST9, if no painting defect in any subdivision is detected, then, a decision is made at step ST10 as to whether or not the counter has counted the predetermined number of images picked up by the image pick-up devices 30. As long as the answer to the decision made at step ST10 is "NO," steps ST5 to ST10 are repeated.

When the answer to the decision made at step ST10 becomes "YES," images representative of all rows of the subdivisions S have been picked up. Then, after returning the upper surface polishing manipulator R1 to its original position shown in FIG. 27 at step ST11, the painting defect detection and polishing control sequence routine ends.

On the other hand, if a painting defect in any subdivision is detected at step ST9, then, after calculating and storing painting defect data, such as a subdivision including a painting defect, a grade of the painting defect and the coordinate of the painting defect, at step ST12, the upper surface polishing manipulator R1 is stopped at step ST13. Subsequently, after polishing the surface defect through steps ST14 to S18, a decision is made at step ST19 as to whether or not the counter has counted the predetermined number of images picked up by the image pickup devices 30. As long as the answer to the decision made at step ST10 is "NO," the steps ST3 to T19 are repeated. When the answer to the decision made at step ST19 becomes "YES," images representative of all rows of the subdivisions S have been picked up. Then, after returning the upper surface polishing manipulator R1 to its original position at step ST11, the painting defect detection and polishing control sequence routine ends.

In the embodiments shown in FIGS. 29 and 30, although the first to third surface polishing manipulators R1, R2 and R3 are moved in the X-direction, in which the vehicle body B moves, the manipulators may also be moved in the direction opposite to the X-direction while picking up images representative of subdivisions of the surface of the vehicle body B. In this case, an original position for each of the surface polishing manipulators R1, R2 and R3 is located almost at the middle of the rail 5. The vehicle body B, in its reference position, has its front end placed at a predetermined distance upstream from the upper surface polishing manipulator R1 in the original position, as shown by a double dotted line in FIG. 1.

It is to be understood that although specific embodiments of the present invention have been described, various other embodiments and variants may occur to those skilled in the art. Any such other embodiments and variants which fall within the scope and spirit of the invention are intended to be covered by the following claims.

What is claimed is:

1. An apparatus for detecting and finishing surface defects in a surface of a workpiece moving at a predetermined speed along an automatic finishing line comprising:

image pickup means for picking up and processing an image of the surface of the workpiece so as to provide defect data representative of any of said surface defects which are on the surface of the workpiece;

finishing means for finishing said surface defects;

drive means, movable in three dimensions, for supporting said image pickup means and said finishing means so that a vertical axis of said finishing means and an axis of a view field of said image pickup means align with each other along a vertical straight line, moving said image pickup means in a direction which is identical to a direction in which said workpiece moves and at a relative speed which is different from a predetermined speed at which said workpiece moves so as to move said image pickup means in one direction relative to said workpiece while picking up said image, moving said finishing means at the same speed as the speed at which said workpiece moves while finishing said surface, and moving said finishing means in another direction, opposite to said one direction, relative to said workpiece toward another surface defect to be subsequently finished;

shift means for shifting said finishing means between an original position, in which said axis of said finishing means and said axis of the view field of said image pickup means are aligned with each other, and a rest position, in which said finishing means is out of said view field of said image pickup means; and control means for causing said shift means to shift said finishing means to said rest position from said original position before said image pickup means picks up said image of said surface of the workpiece and return said finishing means to said original position after said image pickup means has picked up said image and for shifting said drive means so as to place said finishing means in a position on said surface at which said surface defects exist according to said defect data.

2. An apparatus as defined in claim 1, wherein said image pickup means comprises illumination means for providing illumination, said illumination means having a luminance which repeatedly changes with a predetermined luminance gradient from bright to dark and illuminating said surface of the workpiece, and luminance pattern detecting means for detecting a luminance pattern changed by said surface defects.

3. An apparatus as defined in claim 2, wherein said predetermined luminance gradient is changeable according to a curve of said surface of the workpiece.

4. An apparatus as defined in claim 2, wherein the illumination provided by said illumination means includes a black line between highest luminance and lowest luminance.

5. An apparatus as defined in claim 2, wherein the illumination provided by said illumination means includes a bright line between highest luminance and lowest luminance.

6. An apparatus as defined in claim 2, wherein the illumination provided by said illumination means includes a bright line and a black line adjacent to each other between highest luminance and lowest luminance.

7. An apparatus as defined in claim 2, further comprising luminance control means for detecting an actual luminance gradient on said surface of the workpiece and adjusting said illumination so as to cancel a difference between said actual luminance gradient and said predetermined luminance gradient.

8. An apparatus as defined in claim 1, wherein said finishing means is disposed above said image pickup means with respect to said surface of the workpiece, and said shift means causes a parallel movement of said finishing means between said original position and said rest position.

9. An apparatus as defined in claim 8, wherein said drive means comprises an orthogonal type of manipulator.

10. An apparatus as defined in claim 1, wherein said finishing means and said image pickup means are disposed at almost the same distance from said surface of the workpiece and said shift means turns said image pickup means through a predetermined angle.

11. An apparatus as defined in claim 10, wherein said drive means comprises a multiply articulated arm type of manipulator.

12. An apparatus as defined in claim 1, wherein said finishing means comprises a polishing tool.

13. An apparatus as defined in claim 1, wherein said image pickup means comprises a charge coupled camera.

* * * * *